(12) United States Patent
Kawamura

(10) Patent No.: US 7,079,779 B2
(45) Date of Patent: *Jul. 18, 2006

(54) REPEATER APPARATUS, COMMUNICATION EQUIPMENT, COMMUNICATION SYSTEM THEREOF AND REPEATING METHOD

(75) Inventor: Takuya Kawamura, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 233 days.

This patent is subject to a terminal disclaimer.

(21) Appl. No.: 10/263,686

(22) Filed: Oct. 4, 2002

(65) Prior Publication Data

US 2003/0053177 A1    Mar. 20, 2003

Related U.S. Application Data

(62) Division of application No. 09/012,561, filed on Jan. 23, 1998, now Pat. No. 6,480,313.

(30) Foreign Application Priority Data

Jan. 27, 1997   (JP)   .................................... 9-12372

(51) Int. Cl.
*H04B 10/02* (2006.01)

(52) U.S. Cl. ...................... 398/173; 398/174; 398/175; 398/176; 398/177; 398/178; 398/180; 398/181; 398/64; 398/115; 398/118; 398/135; 370/501; 370/315; 370/274

(58) Field of Classification Search ................ 398/62, 398/173, 115, 118, 135, 175, 174, 176, 177, 398/178, 180, 181, 64; 370/501, 315, 274
See application file for complete search history.

(56) References Cited

U.S. PATENT DOCUMENTS

| | | | |
|---|---|---|---|
| 4,727,600 A | | 2/1988 | Avakian |
| 4,959,874 A | | 9/1990 | Saruta et al. |
| 5,247,380 A | | 9/1993 | Lee et al. |
| 5,371,623 A | * | 12/1994 | Eastmond et al. ............. 398/27 |
| 5,384,652 A | * | 1/1995 | Allen et al. .................. 398/126 |
| 5,563,728 A | | 10/1996 | Allen et al. |
| 5,684,801 A | | 11/1997 | Amitay et al. |

(Continued)

FOREIGN PATENT DOCUMENTS

JP    01-018326 A    1/1989

(Continued)

OTHER PUBLICATIONS

Yen et al., "The Use of Directed Optical Beams in Wireless Computer Communications," IEEE Globecome '85 (Dec. 1985), pp. 1181-84.

(Continued)

*Primary Examiner*—Hanh Phan
(74) *Attorney, Agent, or Firm*—Finnegan, Henderson, Farabow, Garrett & Dunner, L.L.P.

(57) ABSTRACT

A repeater apparatus (1001) is constituted from infrared transmitter sections (1s, 2s, 3s) and infrared receiver sections (1r, 2r, 3r) as well as connection control sections (1C, 2C, 3C) and further a repeater section (101), thereby attaining independent communications with the individual one of several associated equipments with respect to infrared communication apparatus of the direct emission type which supports only one-to-one (1-to-1) or one-to-several (1-to-N) communication schemes, thus enabling achievement of N-to-N communication forms by performing transfer of data information being received by each communication equipment to others.

9 Claims, 18 Drawing Sheets

U.S. PATENT DOCUMENTS

| | | |
|---|---|---|
| 5,737,690 A | 4/1998 | Gutman |
| 5,742,602 A | 4/1998 | Bennett |
| 5,786,921 A | 7/1998 | Wang et al. |
| 5,875,179 A | 2/1999 | Tikalsky |
| 5,880,868 A | 3/1999 | Mahany |
| 5,903,373 A | 5/1999 | Welch et al. |
| 5,959,754 A | 9/1999 | Sakurai et al. |
| 5,982,520 A | 11/1999 | Weiser et al. |
| 5,982,762 A | 11/1999 | Anzai et al. |
| 6,097,705 A | 8/2000 | Ben-Michael et al. |
| 6,154,300 A | 11/2000 | Cho |
| 6,480,313 B1 * | 11/2002 | Kawamura ................. 398/173 |

FOREIGN PATENT DOCUMENTS

| | | |
|---|---|---|
| JP | 06-188837 A | 7/1994 |
| JP | 07-336370 A | 12/1995 |
| JP | 08-018325 A | 1/1996 |
| JP | 08-037496 A | 2/1996 |

OTHER PUBLICATIONS

Chu et al., "High Speed Infrared Local Wireless Communication," IEEE Communications Magazine (Aug. 1987), 25:4-10.

* cited by examiner

F I G . 2
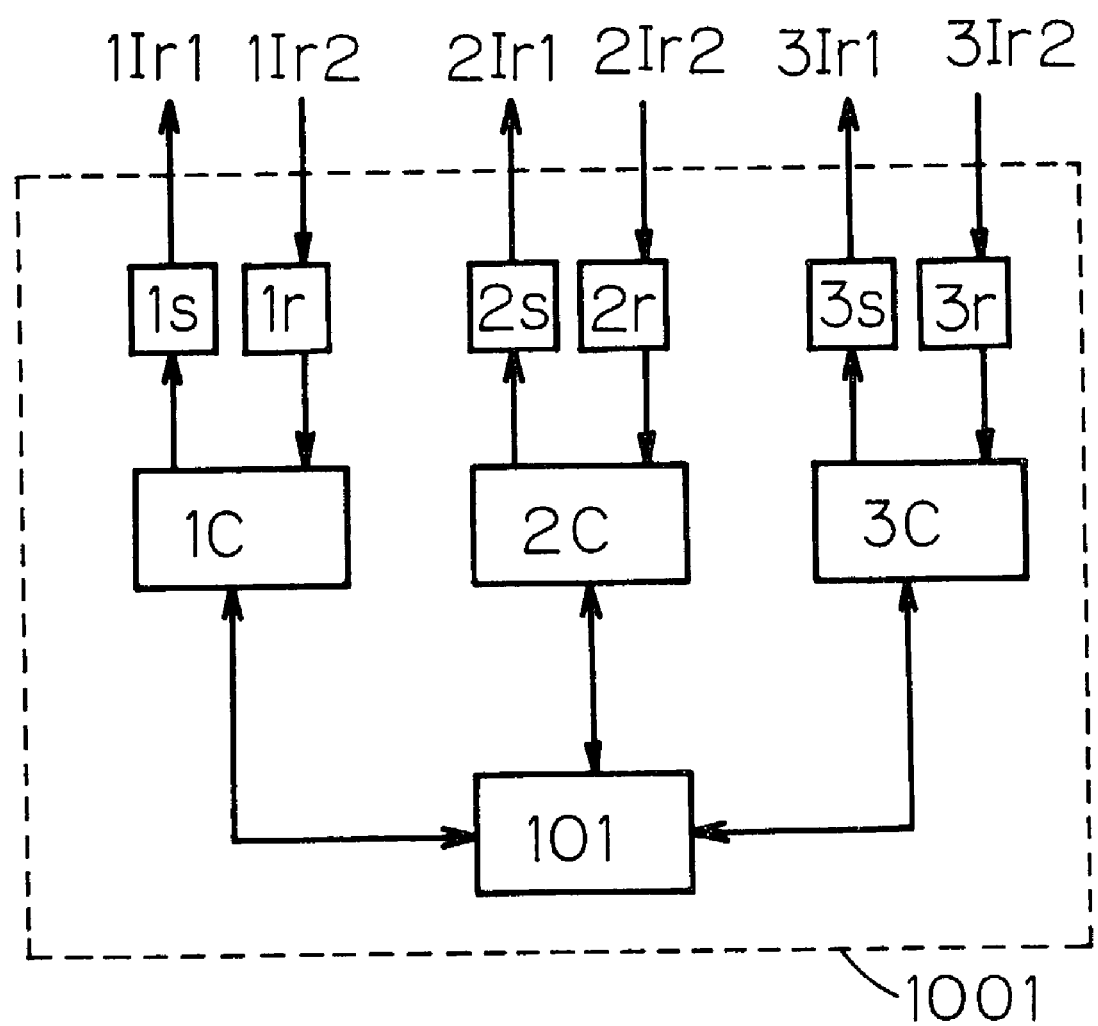

REPEATER APPARATUS, COMMUNICATION EQUIPMENT, COMMUNICATION SYSTEM THEREOF AND REPEATING METHOD

This is a division of application Ser. No. 09/012,561, filed Jan. 23, 1998, which is incorporated herein by reference now U.S. Pat. No. 6,480,313.

BACKGROUND OF THE INVENTION

1. Field of the Invention

The present invention relates to infrared communication repeater apparatus and method in data communications systems for performing communications of the direct emission type while causing out-going infrared radiation to have directivity in infrared communications.

2. Description of the Prior Art

Data communication methods using infrared radiation may typically include two approaches which follow.

A first method is a direct emission type communication method for performing transmission and reception of infrared signal light with one infrared transmitter (simply referred to as "transmitter" hereinafter) and its associated infrared receiver ("receiver").

A second method is a diffusion type communication method of causing infrared radiation as emitted from transmitters to reflect off from ceilings, walls or the like and then allowing receivers to receive the resultant reflected and scattered rays of infrared signal light.

The diffusion type communication method is superior in flexibility of layout of transmitters and receivers than the direct emission type communication method due to the use of reflection and diffusion of infrared signal light at the ceiling or the like; however, the former method is more significant in required transmitter output than the latter because of a reduction or attenuation of the intensity of light in reflection and diffusion events, and also remains higher in reception sensitivity as required for receivers concerned.

A further problem faced with the diffusion type communication method is that the arrival time of infrared radiation signal light at an intended receiver side tends to be retarded or delayed upon affection of multi-paths originated from optical reflection and diffusion, which in turn leads to the risk of interference between a presently received infrared radiation signal and its succeeding one, resulting in limitations of data transmission rate.

On the other hand, the direct emission type communication method is featured in that while any obstructions should not be present between associative communication devices with complete line-of-sight "transparency" or visibility being required therebetween, high-speed data transmission is attainable as compared to the diffusion type communication method because of the fact that any multipath affection leading to occurrence of a delay in reception of infrared signal light hardly takes place unlike the diffusion type communication method, which in turn causes the output required for transmitters to be less than that in the diffusion type communication method while reducing the reception sensitivity as required for transmitters.

In the prior known direct emission type communications apparatus including infrared communication equipment for performing infrared communications by use of standard protocols of IrDA (Infrared Data Association) with regard to infrared communication methods, one-to-one (1-to-1) type communications schemes are employed in most applications, which renders N-to-N type simultaneous communicability unattainable although 1-to-N type communications forms are possible.

SUMMARY OF THE INVENTION

The present invention is drawn to direct emission type infrared communications apparatus that may merely support either 1-to-1 type or 1-to-N type communication forms, and its primary object is to enable accomplishment of an N-to-N type communication form by permitting independent effectuation of communications between individual equipments to thereby transfer data information received by each equipment to another or other equipments.

It is another object of the invention to enable attainment of N-to-N multi-connection communication form via repeater apparatus by performing communications with a connection being set with the individual equipment, especially in the 1-to-1 connection communication type infrared communication method.

To attain the foregoing objects the invention as set forth in claim 1 is a repeater apparatus that has a plurality of infrared transmission/reception means for transmitting and receiving infrared signal light, featured in that said infrared signal light as received by said first infrared transmission/reception means is transmitted from said infrared transmission/reception means other than at least said first infrared transmission/reception means.

The repeater apparatus of the present invention may permit the direct emission type infrared communication equipment merely supporting either 1-to-1 or 1-to-N type communication form to perform independent communications with any one of individual equipments thereby transferring data information transmitted by respective equipments toward other equipments, thus enabling accomplishment of N-to-N communication form.

The invention set forth in claim 2 is a repeater apparatus having a plurality of infrared transmission/reception means for receiving first infrared signal light to convert it into a corresponding electrical signal and for converting an electrical signal to second infrared signal light for transmission, featured in that the first infrared signal light said first infrared transmission/reception means has received is sent forth from said infrared transmission/reception means other than at least said first infrared transmission/reception means.

The repeater apparatus of this invention permits direct emission type infrared communication equipment merely supporting either 1-to-1 or 1-to-N type communication form to communication with individual equipments independently of one another thereby transferring data information transmitted by respective equipments to other equipments, thus enabling accomplishment of the N-to-N communication form.

The invention set forth in claim 3 is repeater apparatus according to claim 1 or 2, featured by performing a communication setting so as to enable information exchange by infrared signal light between a plurality of communication equipments and said plurality of infrared transmit/receive means, while permitting infrared signal light as received by the first infrared transmit/receive means subjected to said communication setting to be transmitted from infrared transmit/receive means subjected to said communication setting other than said first infrared transmit/receive means.

The invention as defined in claim 4 is a communication equipment featured by having communication equipment identification information transmitter means for transmitting a first infrared signal light containing therein communication equipment identification information for identification of the self communication equipment, communication equipment identification information receiver means for receiving a second infrared signal light containing therein communication equipment identification information of another communication equipment, communicable equipment identifier means for identifying certain equipment that is capable of communicating based on communication equipment identification information as received by this communication equipment identification receiver means, group setter means for setting as the same group at least one communication equipment of those communicable communication equipments as identified by this communicable equipment identifier means, and information transmitter means for transmitting by a third infrared signal light the same information as that of communication equipments in the same group as set by this group setter means.

With such communication equipment of this invention, communications using infrared signal light may be attained only when associative communication equipments come closer to each other thereby enabling settings of logical communication links with a desired subscriber at anywhere.

The invention defined in claim 5 is a communication system including a plurality of communication equipments and a repeater apparatus thereof, featured in that each said communication equipment has communication equipment identification information transmitter means for transmitting a first infrared signal light containing therein communication equipment identification information for identification of a self communication equipment, communication equipment identification receiver means for receiving a second infrared signal light containing communication equipment identification information of another communication equipment, communicable equipment identifier means for identifying, based on communication equipment identification information being received by this communication equipment identification information receiver means, certain communication equipment capable of communicating, group setter means for setting as the same group at least one communication equipment of those communicable communication equipments as identified by this communicable equipment identifier means, and information transmitter means for sending forth by a third infrared signal light the same information as that of communication equipment in the same group as set by this group setter means, the system being also featured in that said repeater apparatus has a plurality of infrared transmission/reception means for transmitting and receiving said first infrared signal light, second infrared signal light or third infrared signal light, wherein said infrared signal light received by said first infrared receiver means is transmitted from said infrared transmission/reception means excluding at least said first infrared transmission/reception means.

The communications system of the invention may permit the direct emission type infrared communication equipment merely supporting either 1-to-1 or 1-to-N type communication form to perform independent communications with any one of individual equipments thereby transferring data information transmitted by respective equipments to other equipments, thus enabling accomplishment of N-to-N communication form; furthermore, communications using infrared signal light may be attained whenever associative communication equipments come closer to each other thereby enabling settings of logical communication links with any desired subscriber at anywhere.

The invention as recited in claim 6 is a communication system including a plurality of communication equipments and a repeater apparatus thereof, featured in that each said communication equipment has information transmit/receive means for transmitting and receiving information by infrared signal light, and in that said repeater apparatus has a plurality of infrared transmit/receive means for transmission and reception of said infrared signal light, wherein said infrared signal light as received by said first infrared transmit/receive means is transmitted from said infrared transmit/receive means other than at least said first infrared transmit/receive means.

The communication system of this invention may permit direct emission type infrared communication equipment merely supporting either 1-to-1 or 1-to-N type communication form to perform independent communications with any one of individual equipments thereby transferring data information transmitted by respective equipments to other equipments, thus enabling accomplishment of N-to-N communication form.

The invention recited in claim 7 is a repeating method comprising a reception step of receiving infrared signal light as sent from communication equipment, and a transmission step of at least transmitting said infrared signal light as received at said reception step to communication equipment other than said communication equipment.

Furthermore, the present invention may also be implemented as apparatus and methods which follow.

Apparatus 1 is a repeater apparatus for use in infrared communications, as featured by having at least two or more control means provided with a function of forming a connection between control sections with a similar function of other infrared communication equipments by use of infrared transmitter means and infrared receiver means, and repeater means provided with a transfer function of allowing, before each said control means forms a connection and after formation of such connection thereof, one said control means to input to at least one or more other said control means certain information which has been outputted to the repeater means.

Apparatus 2 is the infrared communication repeater apparatus according to claim 1, characterized in that it has storage means for storing therein information as outputted from said control means to said repeater means, wherein when another infrared communication equipment issues a request for acquisition of information, said repeater means returns such information if this storage means stores therein relevant information thereto.

Apparatus 3 is the infrared communication repeater apparatus according to the apparatus 1, featured in that upon issuance of an information acquisition request from another infrared communication equipment, if said storage means does not store therein such relevant information, said repeater means attempts to obtain and fetch relevant information from another infrared communication equipment, and causes said storage means to store the same, and then returns the relevant information.

Apparatus 4 is the infrared communication repeater apparatus according to apparatus 1, featured by having converter means for converting, where in the apparatus 3 the information as acquired by another infrared communication equipment is at its unique value in the infrared communication equipment which has provided such information, it to an inherent value in the infrared communication repeater apparatus.

Apparatus 5 is the infrared communication repeater apparatus according to apparatus 1, featured in that it has group setter means for setting as a group at least two or more connections as set by said control section between other infrared communication equipments, and in that said repeater means has a transfer function of inputting output information from one equipment to another only within the group as set by this group setter means.

A method 1 is a communication method for performing information transfer of information that has been received by infrared communication equipment supporting the 1-to-1 connection type communication toward another infrared communication equipment, characterized by comprising the steps of receiving a connection set indication or command for a connection set request of said first infrared communication equipment, judging whether a connection set is possible with another said infrared communication equipment, transmitting the connection set request to connection settable infrared communication equipment, receiving, from the infrared communication equipment which has transmitted the connection set request, a confirmation of completion of such connection set, and thereafter returning a connection set response to the first infrared communication equipment, thereby setting a connection between the first infrared communication equipment and another infrared communication equipment.

A method 2 is a communication method as featured by comprising the steps of receiving a data receive indication with respect to a data send request of said first infrared communication equipment, storing data information added to the data receive indication, judging whether a connection is set between it and another infrared communication equipment, and requesting transfer of data added with the data information as stored with respect to said infrared communication equipment which has set the connection.

A method 3 is a communication method as featured by comprising the steps of receiving an information acquisition indication with respect to an information acquisition request for fetching information of said first infrared communication equipment, judging whether the information the information acquisition indication requires is stored or not, returning if relevant information is stored a response to the information acquisition indication as added with information relating to the first infrared communication equipment, transmitting if such relevant information is not stored an information acquisition request for acquiring information pertaining to another said infrared communication equipment, receiving a confirmation containing certain relevant information from the infrared communication equipment which has transmitted the information acquisition request, and thereafter storing the acquired relevant information while returning to the first infrared communication equipment a response to the information acquisition indication added with the relevant information, thereby providing information to the first infrared communication equipment.

A method 3 is a communication method characterized in that in the method 3, it comprises the steps of setting a connection between the first infrared communication equipment and another infrared communication equipment by returning a connection set response to the first infrared communication equipment after receipt of a confirmation of completion of the connection set as sent from the infrared communication equipment which has transmitted the connection set request, managing as a group the connection which has been generated during this process, and thereafter performing information transmission only within the resultant group thus established.

BRIEF DESCRIPTION OF THE DRAWINGS

FIG. 2 is a block diagram showing a configuration of repeater apparatus in accordance with a first embodiment of the present invention.

DETAILED DESCRIPTION OF PREFERRED EMBODIMENTS

First Embodiment

An infrared communication repeater apparatus 1001 in accordance with a first embodiment of the present invention will be explained with reference to FIGS. 1 to 5.

In this embodiment a basic configuration of the infrared communication repeater apparatus (simply referred to as "repeater apparatus" hereinafter) will be explained along with its basic procedures for performing information transfer within the repeater apparatus.

Figure 1:
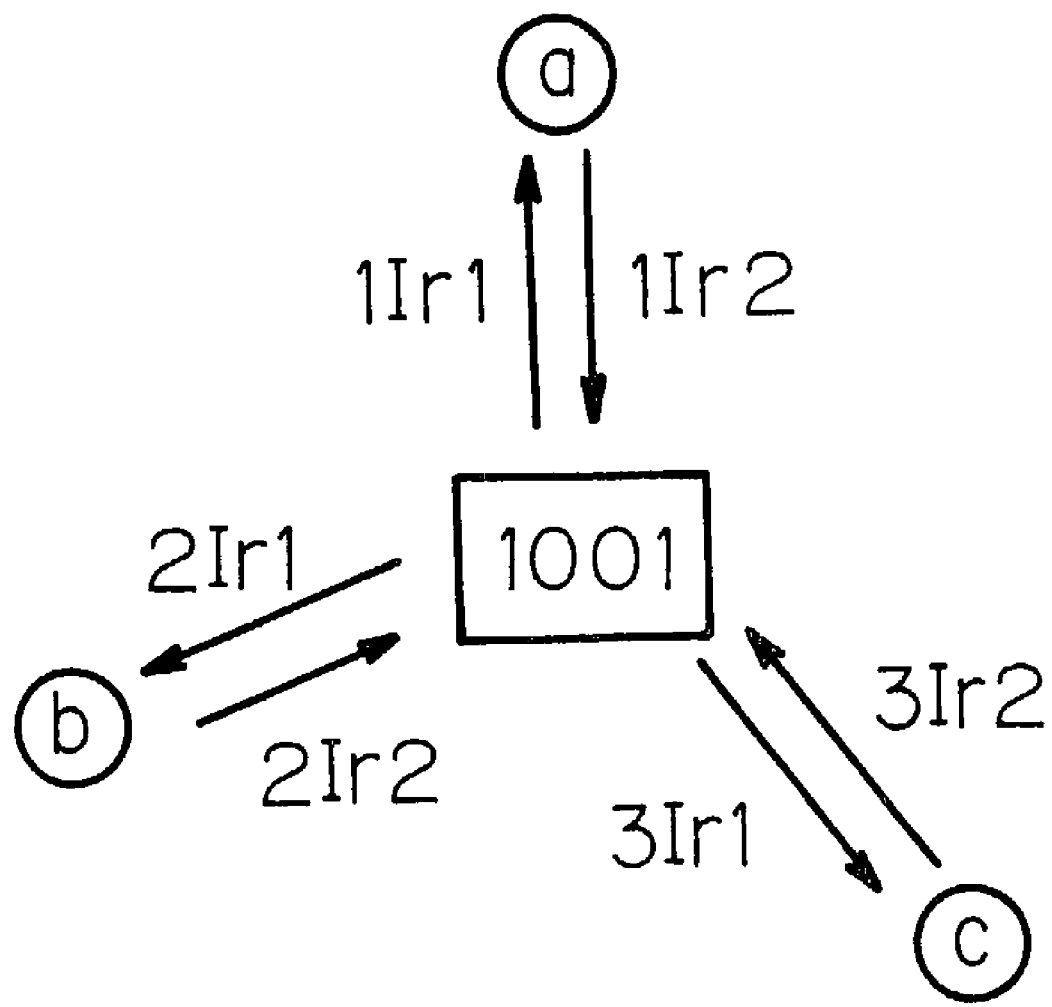
FIG. 1 is an exemplary layout of an infrared communication repeater apparatus and equipments.

FIG. 1 shows one example of the layout of repeater apparatus 1001 and infrared communication equipments (simply referred to as the "equipments" hereinafter) a, b, c that are capable of offering by utilizing this repeater apparatus infrared communications with other equipments operatively associated therewith.

FIG. 2 shows a block diagram of the repeater apparatus 1001.

The repeater apparatus 1001 is constituted from infrared ray transmitter sections 1s, 2s, 3s, infrared receiver sections 1r, 2r, 3r, connection control sections 1C, 2C, 3C, and a repeater section 101.

In the repeater apparatus, the number of the infrared transmitter sections and infrared receiver sections as well as connection control sections may be at least two or more, respectively; while the number should not exclusively be limited to three, the illustrative embodiment is designed to have three ones for purposes of simplification of description only.

Also in some embodiments as will be later described, explanations will be given with the number of the infrared transmitter sections, infrared receiver sections and connection control sections being set at three or four; in this respect, use of such number should not be deemed limitative in any way.

The infrared transmitter sections 1s, 2s, 3s may be certain devices which convert, upon inputting of an electrical signal containing therein data information, the signal to infrared signal light and then emit to the environmental space with the directivity of outward emission angle, or alternatively, may be those devices capable of outputting the same into optical fibers.

The infrared receiver sections 1r, 2r, 3r may be devices that receive infrared radiation signal light (simply referred to as the "infrared radiation" hereinafter) and convert it to an electrical signal containing therein data information for outputting the same.

The connection control sections 1C, 2C, 3C may be certain data link control sections capable of setting connections of selected data link layer levels between respective connection control sections of respective equipments a, b, c.

Note here that the connection control sections may alternatively be either network control sections capable of also setting connections of network layer levels with associative equipments or transport control sections capable of also setting connections of transport layer levels with associative equipments.

When 1r receives infrared radiation 1Ir2 as output from the equipment a and then converts it to an electrical signal for input it to 1C, the connection control section 1C attempts to analyze the content of such electrical signal and outputs the resulting information to the repeater section 101; alternatively, upon input of information from repeater section 101, 1C analyzes its content for conversion to an electrical signal which is then output to 1s.

At 2C, 3C also, the same operations as that of 1C are carried out either among 2s, 2r, 101 or among 3s, 3r, 101, respectively.

Upon input of information from any one of the connection control sections, the repeater section 101 converts the information when necessary for outputting it to another connection control section.

With this operation of the repeater section 101, it becomes possible for the repeater apparatus 1001 to pass information as output from the equipment a to equipment b or equipment c or equipment b, c; or alternatively, route information outputted from equipment b toward equipment a or equipment c or equipment a, c; or still alternatively, send information outputted from equipment c to equipment a or equipment c.

An operation procedure of the repeater section 101 will be explained in detail in conjunction with the flow charts of FIGS. 3, 4 and 5.

Figure 3:
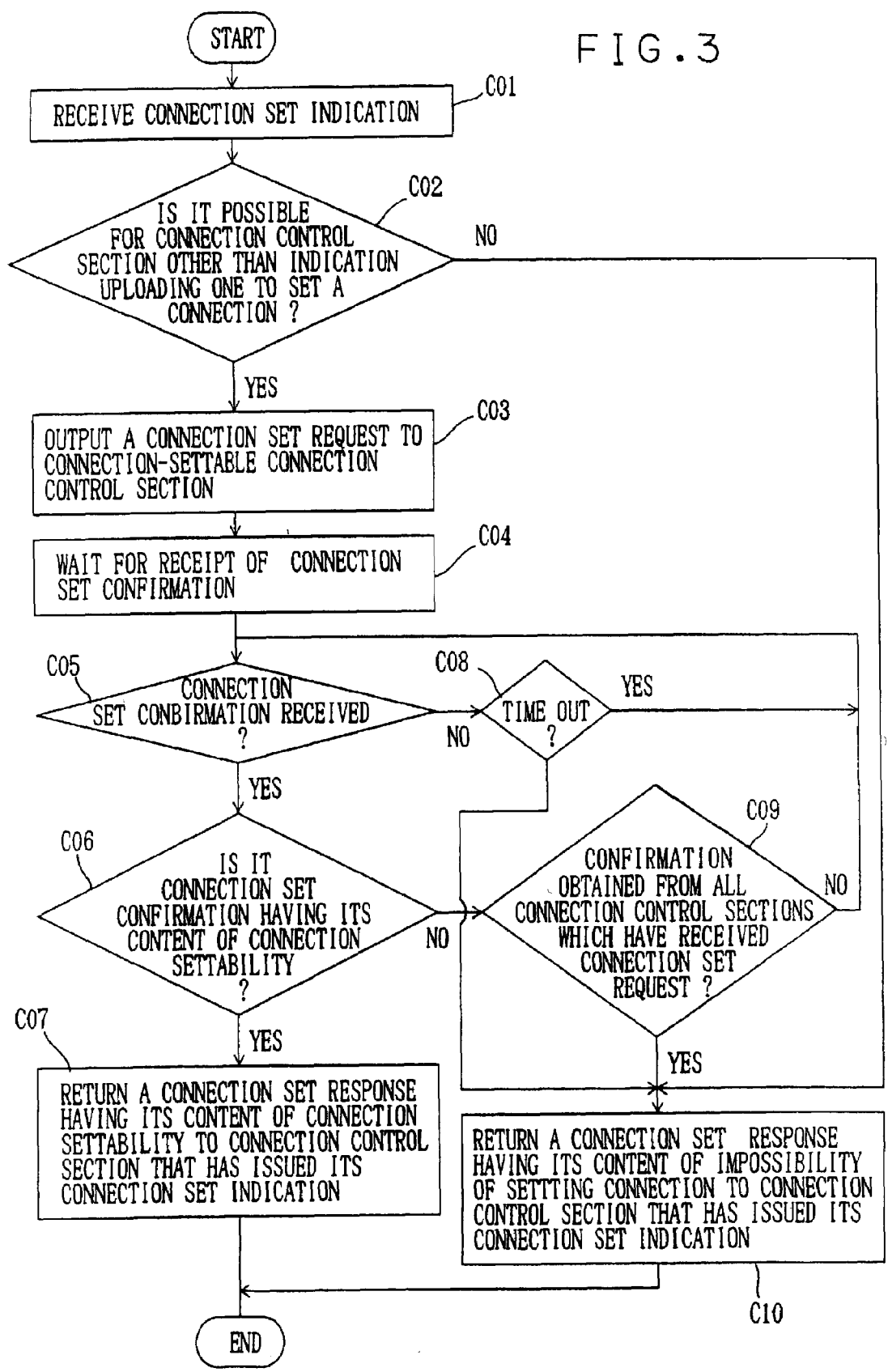
FIG. 3 is a flow chart showing an operation upon establishment of a connection in a repeater section in accordance with the first embodiment of this invention.

FIG. 3 is a flow chart showing a setting procedure as executed by the repeater section 101 that attempts to set connections among equipments a, b, c, including a connection between repeater 1001 and equipment a, another connection between repeater 1001 and equipment b, and a yet another connection between repeater 1001 and equipment c—namely, setting multi-connections.

For example, upon receipt of a connection set indication from the connection control section 1C (at step C01), the repeater section 101 determines whether it is possible to issue a connection set request to the connection control sections 2C, 3C (at step C02); if it is impossible to issue such connection set request with respect to all the connection control sections, then return to 1C a response that indicates the impossibility of a connection set under request (at step C10).

If it is possible to issue the connection set request to any one of the connection control sections then issue the connection set request to that connection control section (at step C03).

Wait for receipt of a confirmation from the connection control section that has received the connection set request (at step C04); if the confirmation is received which affirms completion of such connection set (at step C05, step C06), then send a response to the connection control section 1C showing the allowability of connection set as requested (at step C07).

In the case of receiving from all the connection control sections which have received the connection set request the confirmation with its content of impossibility of connection set (at step C09), or in the case of measuring time duration upon issuance of the connection set request and receiving no confirmation messages permitting execution of the connection set until a due time has elapsed (at step C08), provide 1C with a response indicating impossibility of any connection set under request (step C10).

Figure 4:
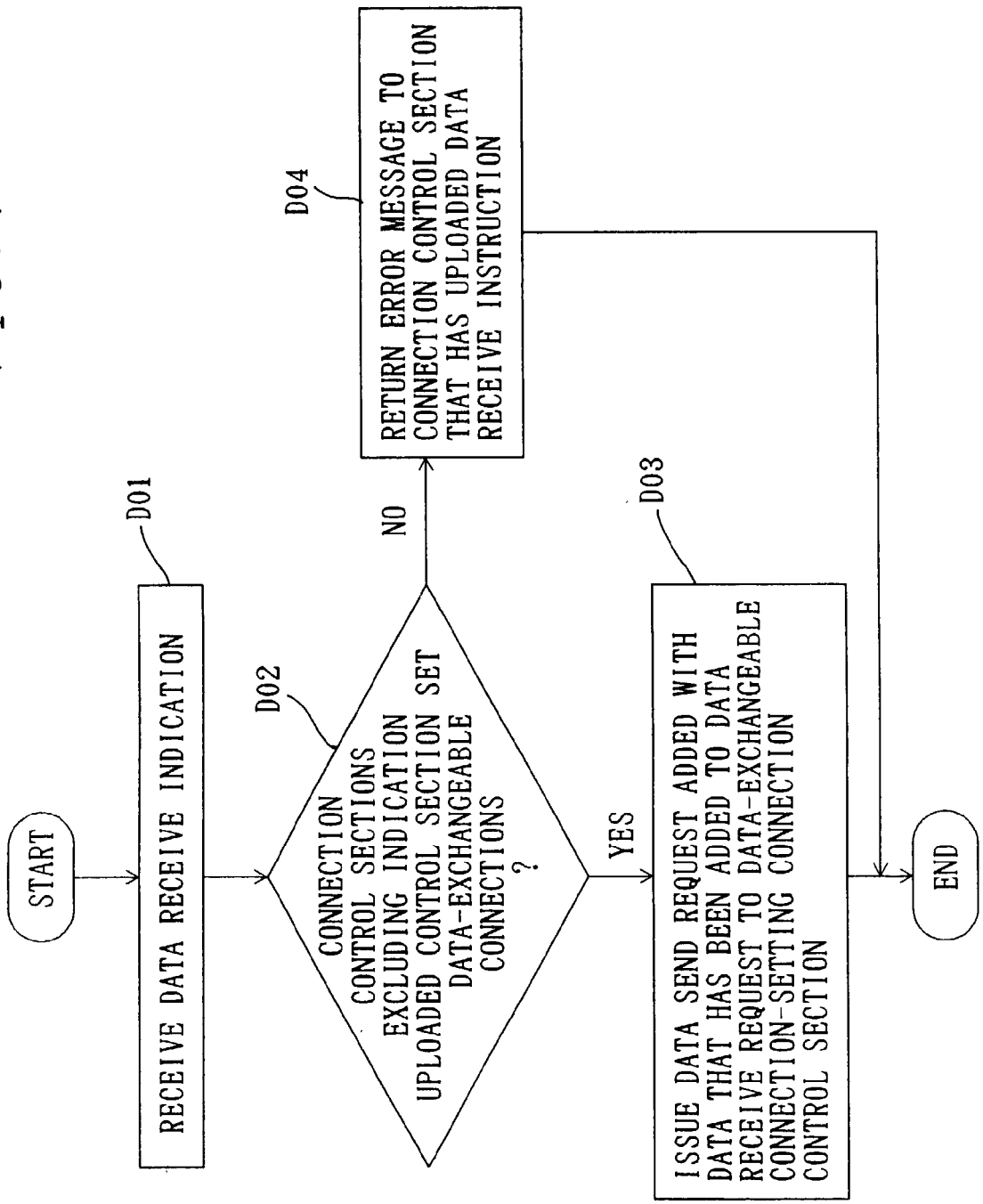
FIG. 4 is a flow chart showing an operation during data transmission in the repeater section in accordance with the first embodiment of the invention.

FIG. 4 is a flow chart showing a procedure of data exchange which allows the repeater section 101 to exchange data by utilizing multiconnections after setting multiconnections among equipments a, b, c.

Upon receiving a data receive indication from the connection control section 1C (at step D01), the repeater section 101 attempts to determine whether 2C, 3C are set with connections (at step D02); if no connections are set at any one of the connection control sections then return an error message to 1C (at step D04).

If a connection is set, then issue a data send request added with data that has been added to the data receive indication as received from 1C with respect to the connection control section which is doing a connection set (at step D03).

Figure 5:
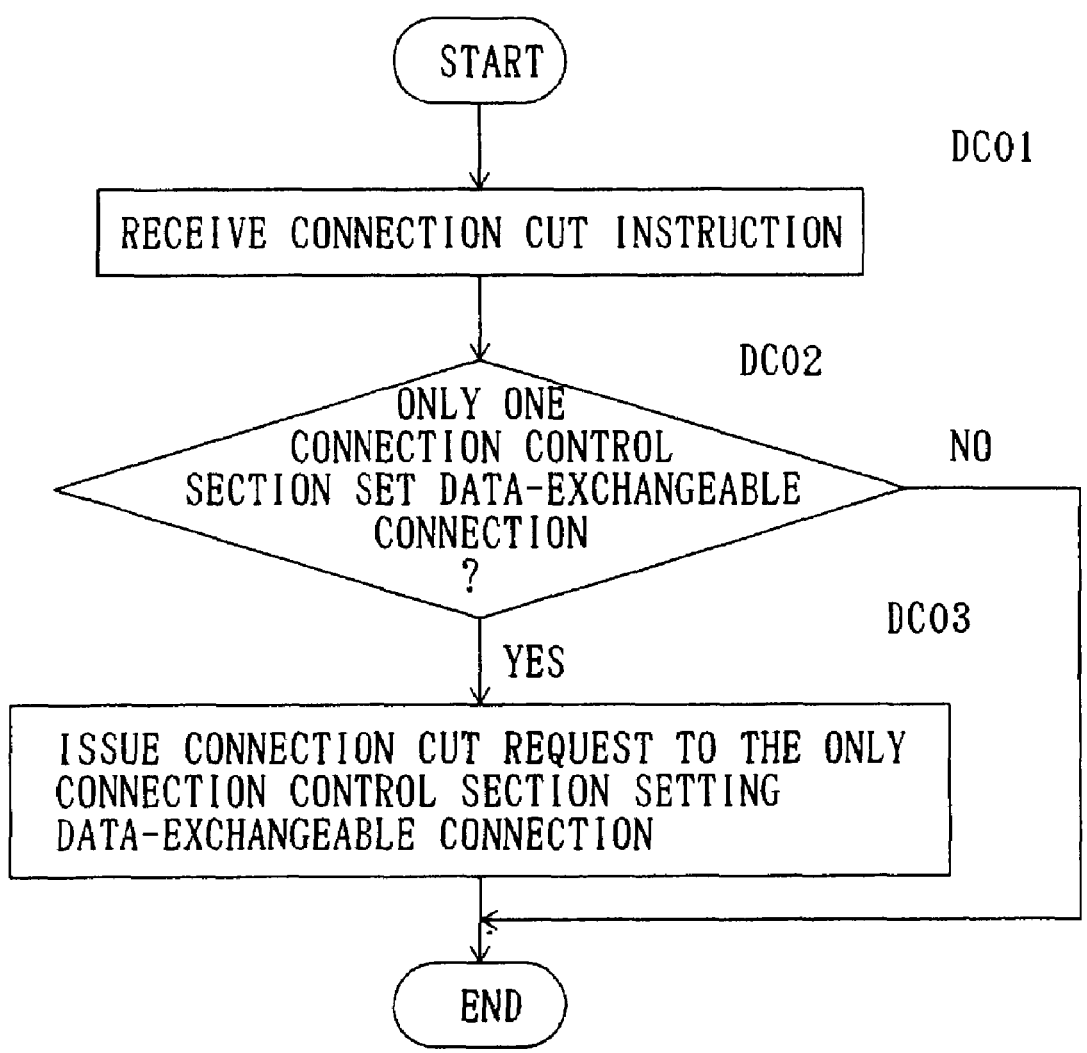
FIG. 5 is a flow chart showing an operation upon interrupting of a connection in the repeater section of the first embodiment of the invention.

FIG. 5 is a flow chart showing a procedure of interrupting or cutting connections as executed by the repeater section 101.

When a connection cut indication is received from the connection control section 1C (at step DC01), determine whether connections are set at 2C, 3C (at step DC02); if only either one of them is set with a connection then issue a connection cut request to the only connection control section which is setting the connection (at step DC03).

Second Embodiment

A repeater apparatus in accordance with the second embodiment of the instant invention will then be explained with reference to FIGS. 6 and 7.

In the second embodiment there will be explained hereinafter a basic configuration of the repeater apparatus which has the second feature of the repeater apparatus of this invention, wherein it stores information as acquired from one certain equipment, provides information being stored upon receipt of an information get request from another equipment, and provides, in cases where no such information is stored, information to the equipment that has issued such information get request by acquiring the information from another equipment; also explained below is a basic information acquisition procedure within the repeater apparatus.

A layout example of a repeater apparatus 1002 and equipments a, b, c is similar to that of FIG. 1 with the repeater apparatus 1001 being replaced by 1002.

Figure 6:
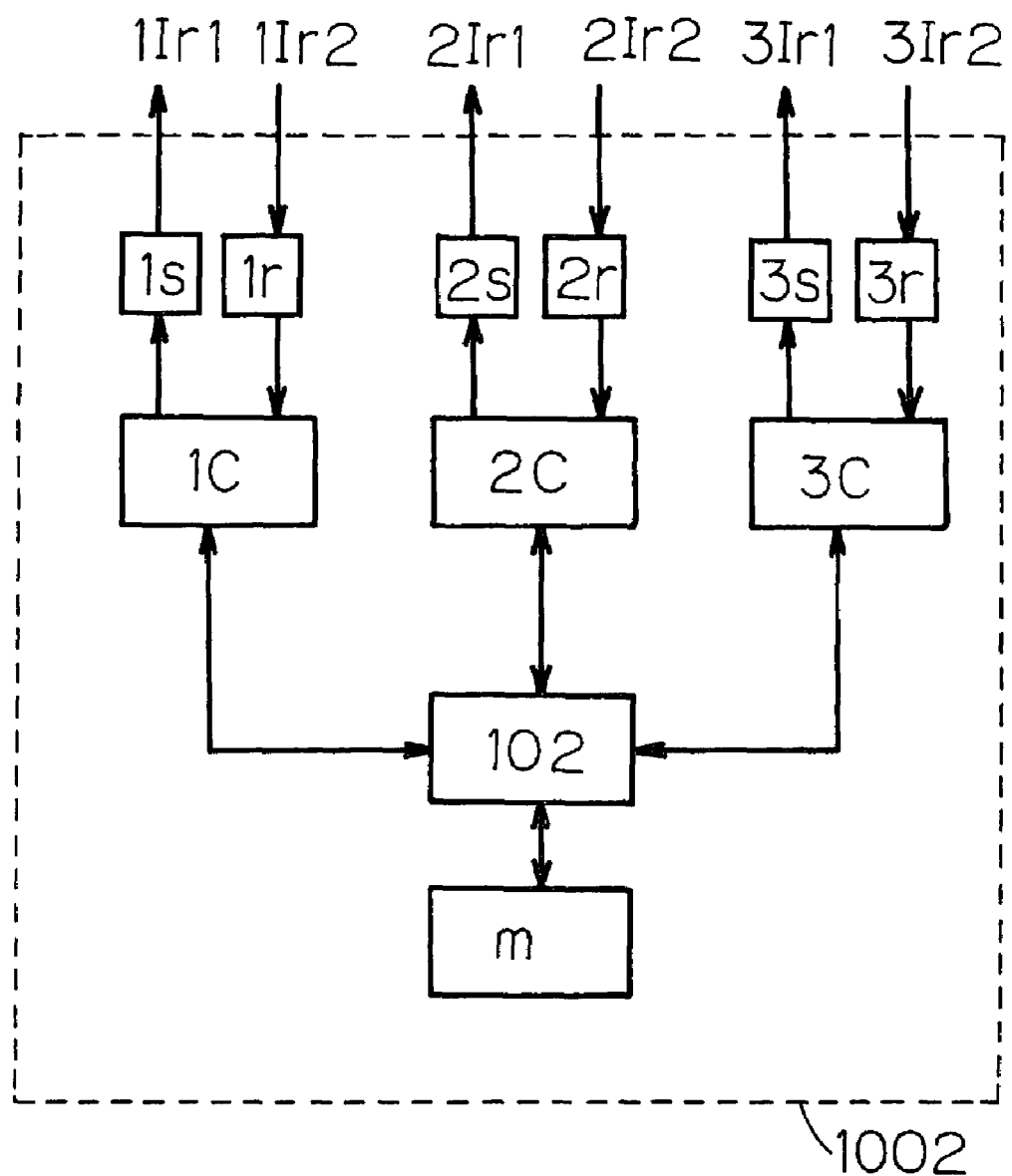
FIG. 6 is a block diagram showing a configuration of infrared communication apparatus in accordance with a second embodiment of the invention.
Figure 7:
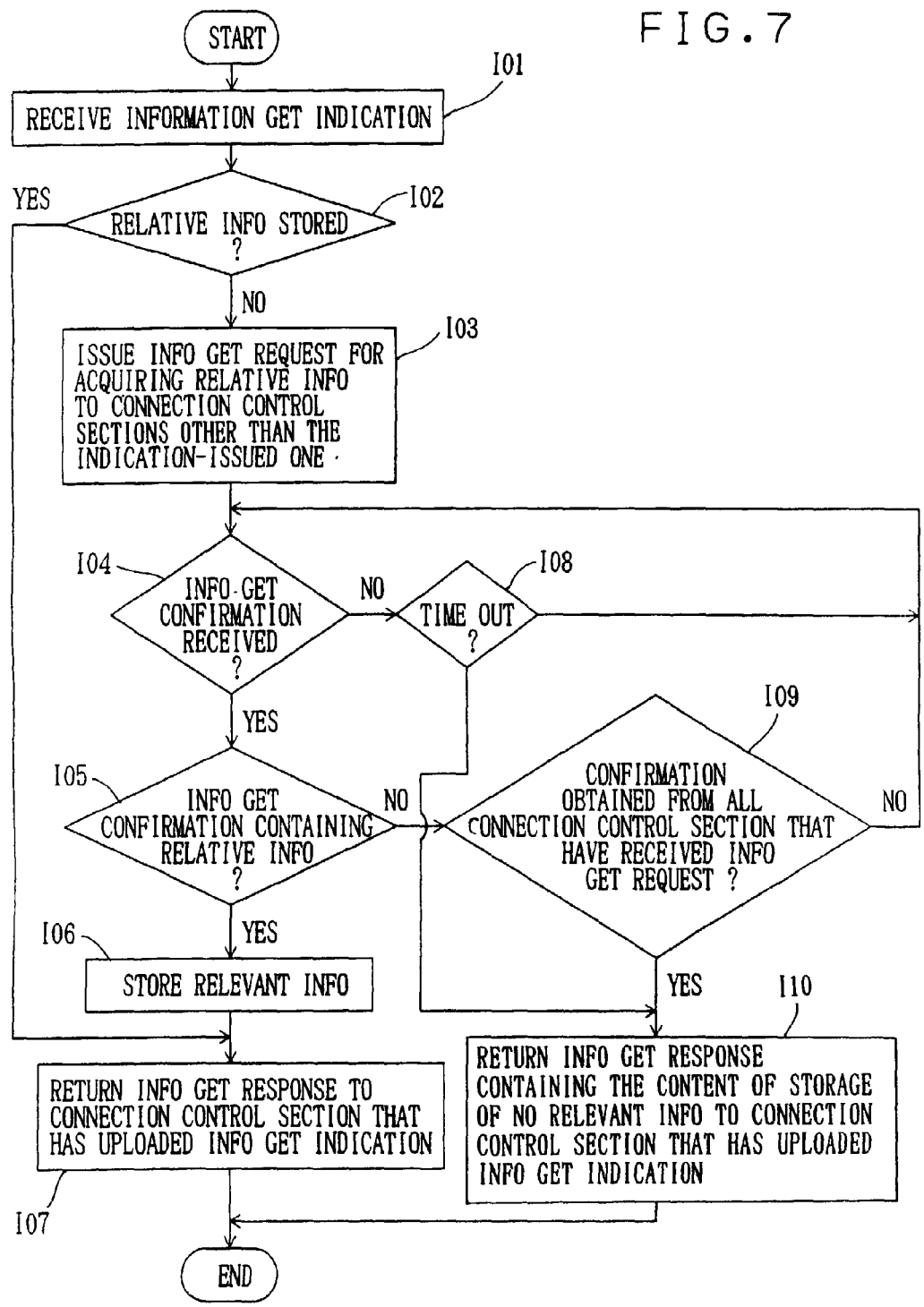
FIG. 7 is a flow chart showing an information acquisition procedure in a repeater section of the second embodiment of the invention.

FIG. 6 shows a block diagram of the repeater apparatus 1002.

In this embodiment a storage section m is added to the embodiment of FIG. 2.

The storage section m stores therein information as input to the repeater section 102 from 1C, 2C, 3C, allowing repeater section 102 to refer to storage section m when an information get indication comes from any one connection control section; in that case, if m stores relevant information, it is then possible to return a response containing such information to the connection control section.

By way of example, where the equipment b has both an application for performing image data transmission/reception and an application for effectuating audio data transmit/receive operations, when the information the repeater section 102 has received from the connection control section 2C contains therein certain information indicating that the equipment b has the image data transmit/receive and audio data transmit/receive applications, this is then stored in storage section m.

As a result that the equipment a has issued to the repeater apparatus 1002 an information get request of questioning the type of an application the repeater apparatus 1002 possesses, the repeater section 102 may receive an information get indication from the repeater section 102.

The repeater section 102 operates to refer to the storage section m and convert the prior stored information into information indicating that the repeater section per se has both the image data transmit/receive application and audio data transmit/receive application, thereby issuing to 1C a response containing it.

With such a processing, the equipment a understands that the repeater apparatus 1002 has an image data transmit/receive application, and, upon issuance of a connection set request for image data transmission and reception, the repeater section 102 executes a connection set with the application for transmission/reception of image data of equipment b, forming a multiconnection with the equipment a and equipment b via repeater apparatus 1002 thereby enabling transmission/reception of image data between equipment a and equipment b.

The repeater section 102 also includes a function which follows: upon receipt of an information get indication from a certain connection control section, the repeater section 102 attempts to refer to the storage section m; if m does not store therein any relevant information, issue an information get request to another connection control section in order to obtain the relevant information therefrom.

An operation routine of the repeater section 102 concerning information acquisition will now be explained below with reference to the flow chart of FIG. 7.

For instance, when an information get indication is received from the connection control section 1C (at step I01), the repeater section 102 operates to refer to the storage section m (at step I02). If storage section m stores therein information pertinent to the content of such information get request, then issue to 1C a response in reply to the information acquisition containing such information (at step I07).

On the other hand, where the storage section m does not store therein any relevant information, the repeater section 102 generates and issues to 2C and 3C an information get request in order to acquire or fetch such information pertinent to the content of the information get request (at step I03).

Wait for receipt of confirmation in reply to the information get request from the connection control section which has received the information get request (at step I04); if it is possible to receive such confirmation containing relevant information (at step I05), then cause the storage section m to store therein the content thereof (step I06); also, send a response to 1C a response that involves such content (step I07).

In cases where it was unable to acquire any relevant information from all the connection control sections which have received the information get request (at step I09) and/or where any information was not able to be acquired until elapse of a predefined time duration (step I08), issue to 1C a response that indicates unavailability of relevant information (step I10).

Third Embodiment

A repeater apparatus 1003 in accordance with the third embodiment of the invention will be explained in conjunction with some of the accompanying drawings.

In the third embodiment an explanation will be given of a fundamental configuration of the repeater apparatus which has the third feature of the repeater apparatus of this invention for enabling, by grouping connections being set among a plurality of associated equipments, exclusive information transfer between or among multiconnections belonging to a group only.

A layout example of the repeater apparatus 1003 and its operatively coupled equipments a, b, c may be similar to that of FIG. 1 with the repeater apparatus 1001 being replaced with 1003.

Figure 8:
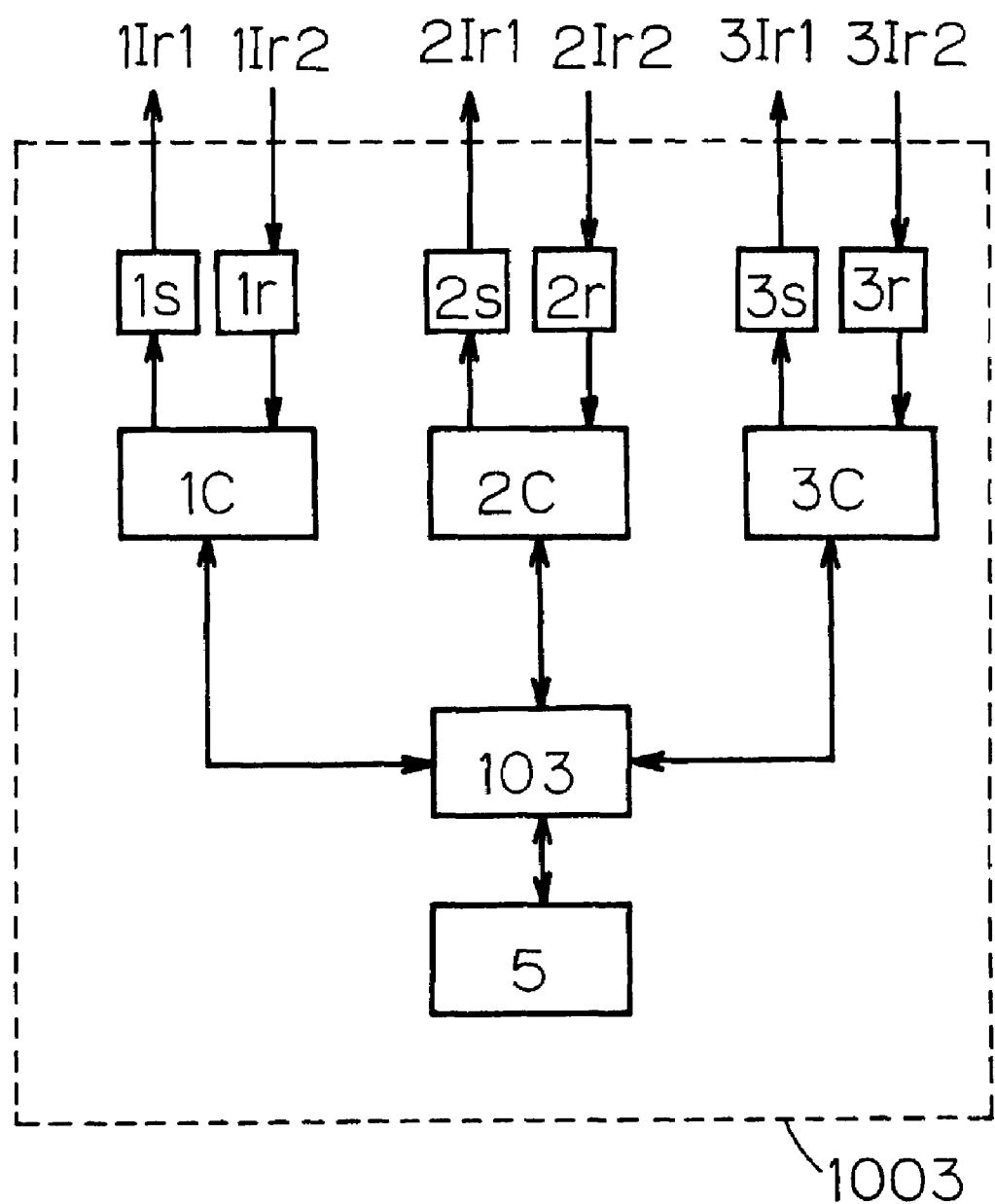
FIG. 8 is a block diagram showing a configuration of repeater apparatus in accordance with a third embodiment of the invention.

FIG. 8 shows a block diagram of the repeater apparatus 1003.

In this embodiment a group setter section 5 is added to the embodiment of FIG. 1. The group setter section 5 functions to set at least two or more connections as a group in those connections as set by the connection control sections 1C, 2C, 3C.

When one connection control section attempts to set a connection, the matter of which group such connection belongs to is managed with an identifier added thereto.

Where the connection control section inputs to the repeater section 103 output information from a connection belonging to a given group as set by the group setter section, the repeater section 103 judges the group then permitting the information to be transferred and input to only the connection control section which has set the connection belong to such group.

One example is that where the repeater apparatus 1003 sets a connection for image data transmission/reception as a multiconnection among equipments a, b, c while repeater apparatus 1003 sets a connection for audio data transmission/reception as a multiconnection between equipments a, b, the group setter section 5 is operable to set that the connection each connection control section is setting for purposes of image data transmission/reception may belong to a group 1 and also set that the connection each connection control section is setting for audio data transmission/reception purposes may belong to a group 2.

Upon receipt, from the connection control section 1C as a data receive indication, of information outputted from the connection with the identifier added thereto for audio data transmission/reception, then generate and issue a data send request only to 2C to thereby ensure that the information is input to the connection with the identifier for audio data transmission/reception of the connection control section 2C that has set the connection belonging to the group 2.

Alternatively, the above may be modified in a way such that as the method of setting a group and performing information transfer only at specific connections belonging to the same group, the group setter section 50 serves to form, for assignment, repeater sections 104 and 105 under control of the group setter section 50 which performs information transfer with respect to each group independently of each other.

Figure 9:
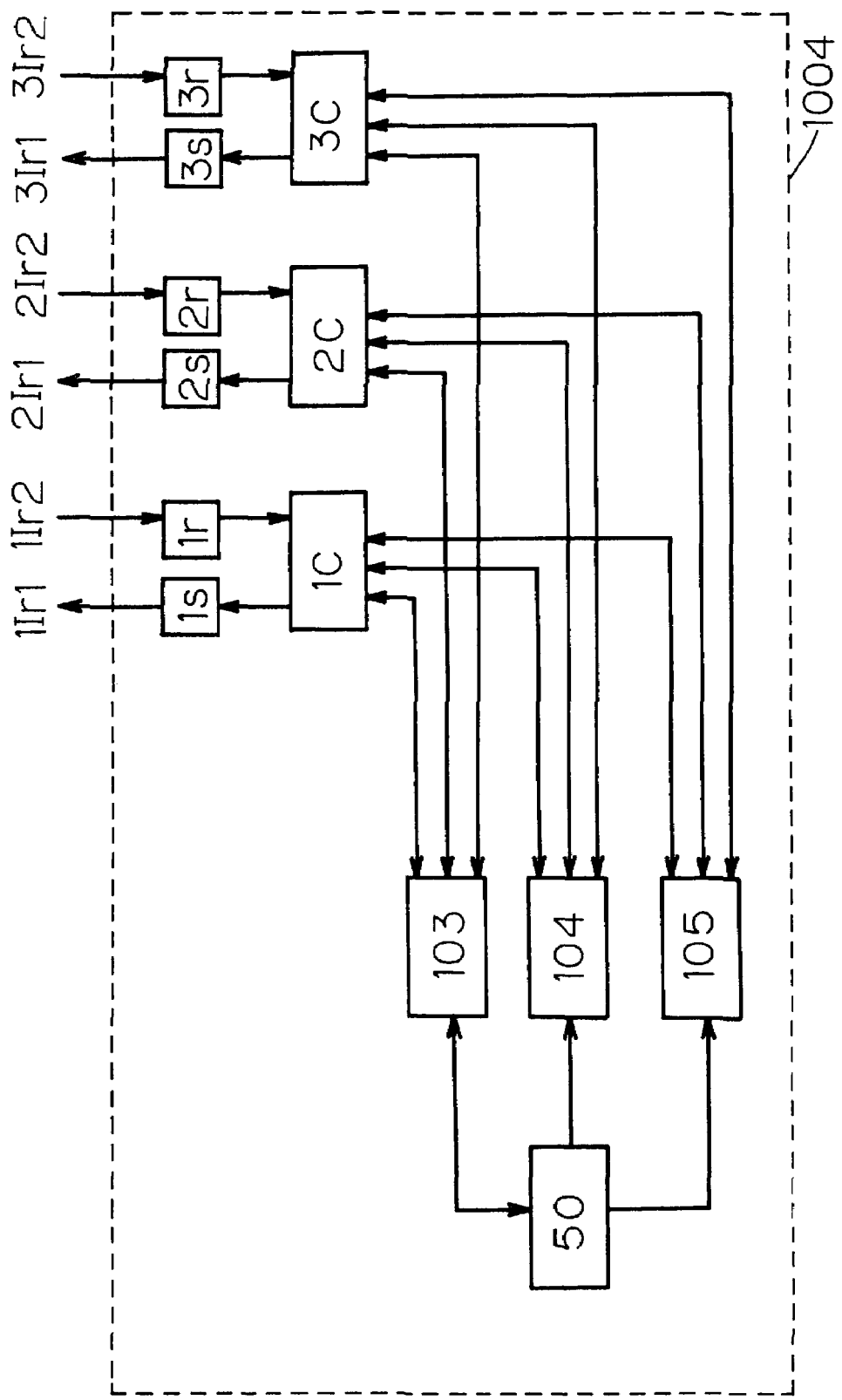
FIG. 9 is a block diagram showing a configuration of the repeater apparatus in accordance with the third embodiment of the invention.

FIG. 9 shows a block diagram of the infrared repeater apparatus 1004 for implementation of this method.

For example, where the equipment a issues a connection set request for performing image data transmit/receive operations, the connection set request from 1C is uploaded to the repeater section 104 the group setter section has already prepared. The repeater section 104 generates and issues to 2C, 3C a connection set request for image data transmission/reception, then performing preparation of a multiconnection.

Once such multiconnection was established, transfer of image data by the repeater apparatus 1004 is then carried out using the repeater section 104.

Also, use of the repeater section 105 for transferring audio data may enable the audio data transmission via repeater apparatus 1004 to be executed using the repeater section 105 once after establishment of such multiconnection.

Fourth Embodiment

Next, further detailed explanations will be given, as a fourth embodiment of this invention, of a connection set procedure and data transfer routine as well as connection cut routine disconnect in the case of performing information transmission within the repeater apparatus as has been described in the embodiment 1, along with a procedure of finding equipment for use in verifying whether connection-settable equipment is present in a communicable region prior to execution of setting a connection, and moreover an embodiment having a storage section for storing therein information as acquired from another equipment.

Furthermore, the embodiment 4 is designed to provide four direct emission type infrared communications apparatus with an N-to-N type communication form among four associative equipments while permitting establishment of multiconnections.

A repeater apparatus 1000 of this invention will be explained based on the accompanying drawings.

Figure 10:
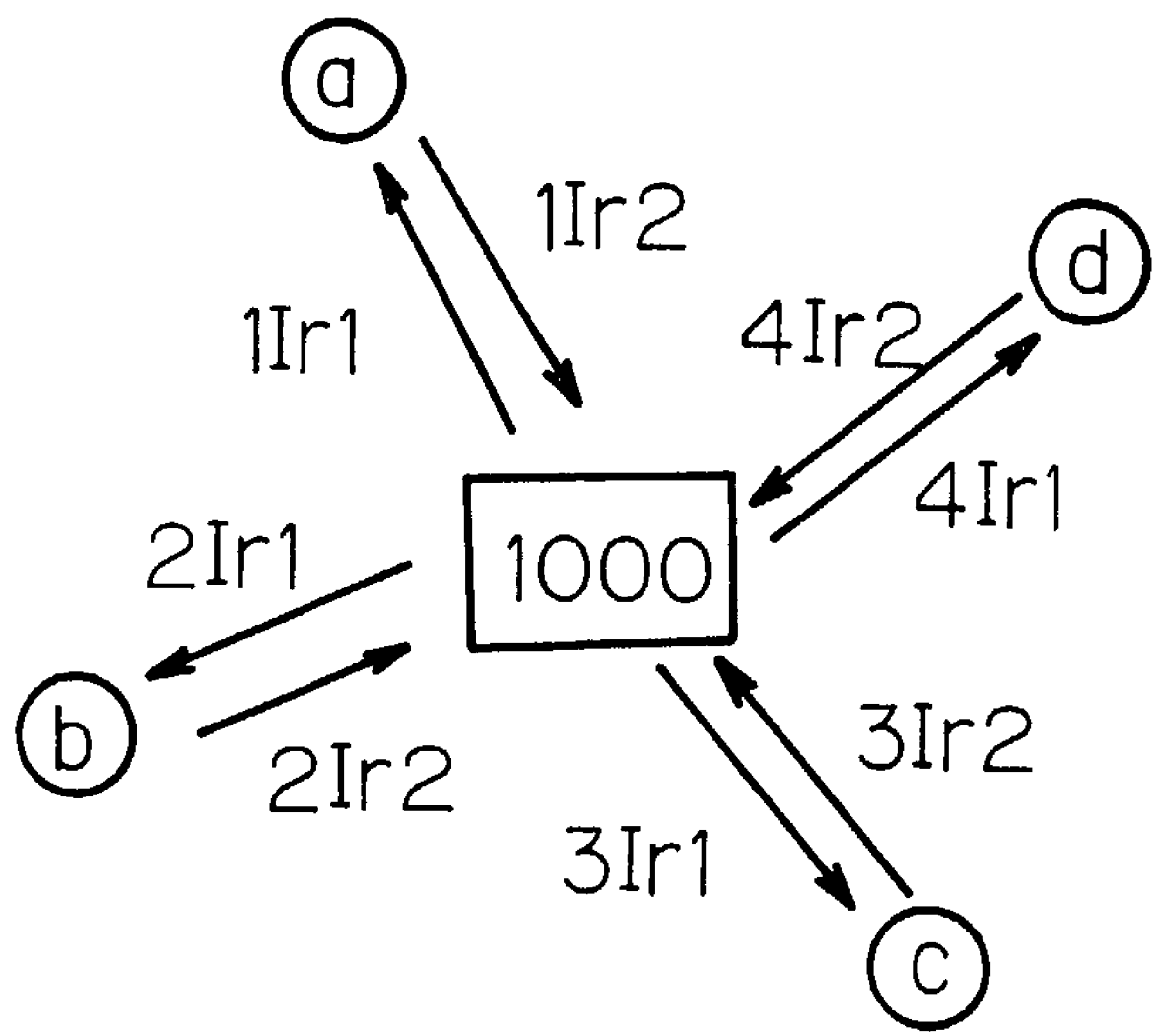
FIG. 10 is an exemplary layout of repeater apparatus in accordance with a fourth embodiment of the invention and equipments operatively associated therewith.

FIG. 10 is one exemplary layout of the repeater apparatus of this invention and a plurality of equipments a, b, c, d associated therewith, which apparatus is configured to perform connection-less type communications and connection type communications among respective equipments.

Figure 11:
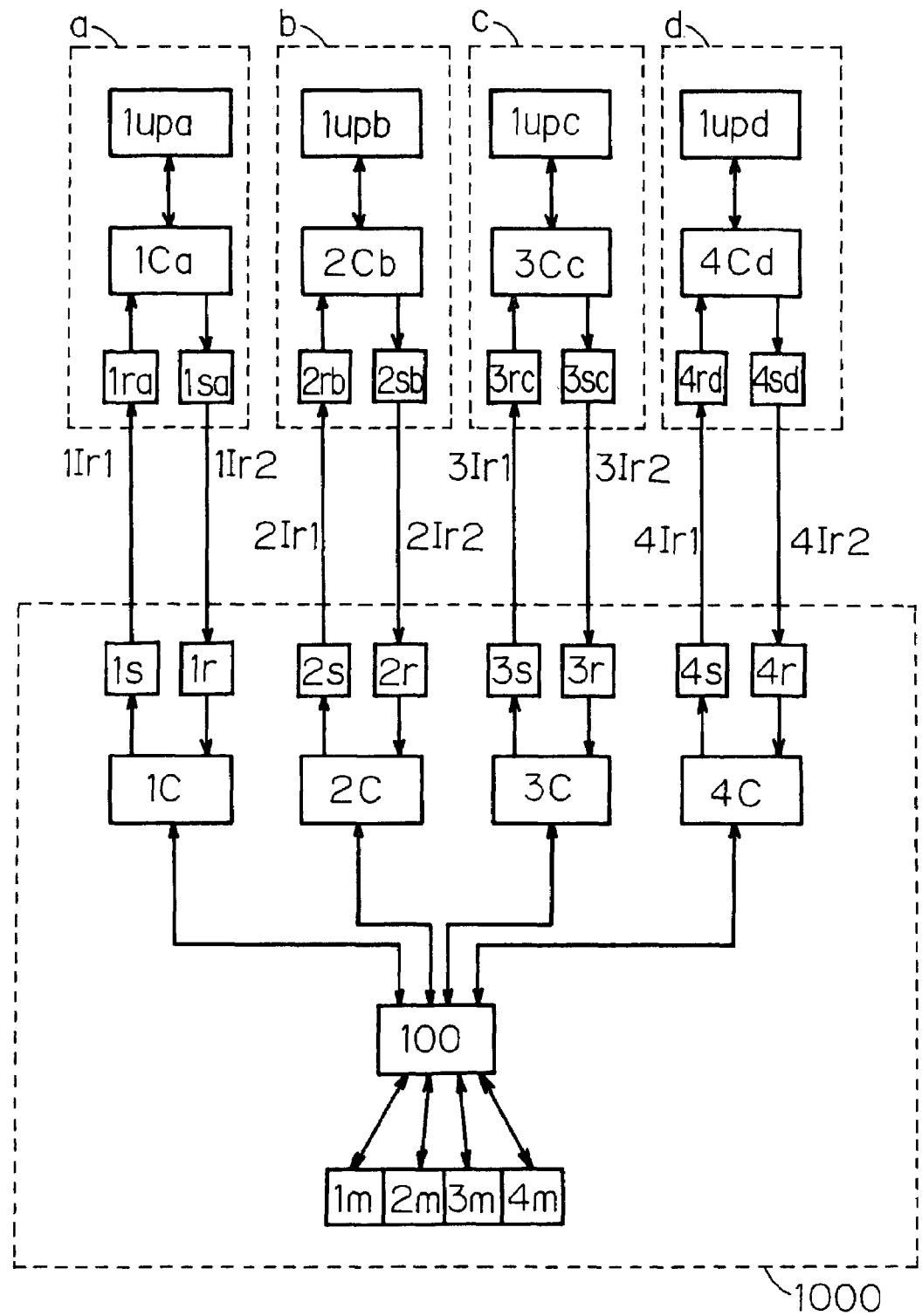
FIG. 11 is a block diagram showing an arrangement of equipment that may communicate with the repeater apparatus of the fourth embodiment of the invention by utilizing repeater apparatus.

FIG. 11 shows a block diagram of 1000.

1s is an infrared transmitter section, which is the device for converting an electrical signal to infrared radiation and sending forth the same.

1r is an infrared receiver section which is the device for receiving infrared light for conversion to an electrical signal.

1C is a data link control section capable of forming a connection with a data link control section 1Ca of another equipment a, by way of example, and of performing a frame exchange.

2s, 3s, 4s are infrared receiver sections which have the same functions as that of 1s; 2r, 3r, 4r are infrared receiver sections that are the same in function as 1r; and, 2C, 3C, 4C are data link control sections having the same function as that of 1C.

100 is a repeater section for inputting information as output from one data link control section to another data link control section.

The repeater apparatus 1000 is constituted from the constituent elements discussed above.

Constituent elements of the equipments a, b, c, d are as shown in FIG. 11, wherein the equipments a, b, c, d are comprised of infrared transmitter devices 1sa, 2sb, 3sc, 4sd, infrared receiver devices 1ra, 2rb, 3rc, 4rd, data link control sections 1Ca, 2Cb, 3Cc, 4Cd, and upper layers 1upa, 1upb, 1upc, 1upd.

A repeating or routing operation of the repeater apparatus 1000 will be explained below.

1C, 2C, 3C, 4C of the repeater apparatus 1000 pass to the repeater section 100 various kinds of indications and confirmation, whist repeater section 100 passes to 1C, 2C, 3C, 4C various kinds of requests and response.

For instance, when various requests or responses are passed from the repeater section 100, 1C attempts to constitute a frame in conformity therewith, send it to 1s, and also analyze a frame based on a signal as received from 1r thereby passing it to repeater section 100 as various indications or confirmations.

Further, it will also be possible in some cases that as a result of analyzing the frame using a signal received from 1r, a new frame is created for transmission to 1s.

FIRST PRIMITIVE EXAMPLE

As a first, primitive example between the data link control sections 1C, 2C, 3C, 4C and repeater section 100, a flow will be explained of a processing, between respective constituent elements, of several signals such as requests, indications and confirmations during "discovery" services for affirming whether the connection set is possible where equipment is present within a communicable region.

When 1upa of equipment a sends forth a discovery request to 1Ca, 1Ca operates to constitute a frame for discovery and send it to the infrared transmitter section 1sa.

1sa converts an electrical signal to an infrared radiation signal 1Ir2 for transmission.

When the infrared receiver section 1r of repeater apparatus 1000 receives infrared radiation 1Ir2, then convert it to an electrical signal passing it to 1C.

At 1C, frame analysis is done for recognition as a discovery frame, then sending forth a discovery indication to repeater section 100.

Also, prepare an address for identifying 1C, and constitute a discovery frame into which this is written for transmission to 1s.

Upon receipt of the discovery indication from 1C, 100 causes a storage section 1m, which is for storage of the resulting information as obtained from 1C, to store therein the content of such discovery indication.

In the case of the discovery indication, if an address is written which is for identification of 1Ca as prepared by 1Ca of a, then repeater section 100 stores it in 1m.

Also, send a discovery request to 2C, 3C, 4C which are those data link control sections other than 1C.

Upon receipt of discovery confirmation from 2C, 3C, 4C after the discovery request has sent to the data link control sections 2C, 3C, 4C, the section 100 stores the content of a discovery confirmation from 2C into a storage section 2m for storage of information as obtained from 2C, and stores the content of a discovery confirmation from 3C into a storage section 3m for storage of information as obtained from 3C, moreover stores the content of a discovery confirmation from 4C into a storage section 4m for storage of information as obtained from 4C, respectively.

SECOND PRIMITIVE EXAMPLE

As a second, primitive example between the data link control sections 1C, 2C, 3C, 4C and repeater section 100, a flow will now be explained of a processing, between respective constituent elements, of several signals such as requests, indications, responses and confirmations during connection set services for establishing connections with associative equipment(s).

When 1*upa* of the equipment a sends to 1C a connection set request assigning the address of 1C, 1Ca constitutes a frame for such connection set and sends it to the infrared transmitter section 1*sa*.

1Ca converts an electrical signal to an infrared signal 1Ir2 and then sends forth it.

When the infrared receiver section 1*r* of repeater apparatus 1000 receives the infrared radiation 1Ir2, this section converts it to an electrical signal for passing to 1C.

At 1C, frame analysis is performed for recognition as a connection set frame to thereby send a connection set indication to the repeater section 100.

Upon receipt of the connection set indication from 1C, 100 stores the content of such connection set indication into the storage section 1m, which is designed to store therein information obtainable from 1C.

In the case of such connection act indication, if a connection handle has been written which is for identification of a connection between 1Ca and 1C, then store it. 100 sends to 1C a connection set response with the connection handle being written therein for identification of the connection between 1Ca and 1C as stored in 1m.

Also, 100 attempts to refer to the storage sections 2m, 3m, 4m; for example, if 2m stores therein an address for identifying the data link control section 2Cb of equipment b, then send to 2C a connection set request with the address of 2Cb designated; alternatively, if 3m stores an address for identifying the data link control section 3Cc of equipment c, then send to 3C a connection set request with the address of 3Cc designated; still alternatively, if 4m stores an address for identifying the data link control section 4Cd of equipment d then send to 4C a connection set request with the address of 4Cd designated.

Upon reception of connection set confirmations from 2C, 3C, 4C after having sent the connection set request to the data link control sections 2C, 3C, 4C, then 100 stores the content of a connection set confirmation from 2C into the storage section 2m for storage of information as obtained from 2C, stores the content of a connection set confirmation from 3C into the storage section 3m for storage of information as obtained from 3C, and stores the content of a connection set confirmation from 4C into the storage section 4m for storage of information as obtained from 4C, respectively.

THIRD EXAMPLE OF PRIMITIVE

As a third primitive example between the data link control sections 1C, 2C, 3C, 4C and repeater section 100, a flow will then be explained of a processing between respective constituent elements of signals such as requests, indications, responses and confirmations during connection set services for setting connections with associative equipment(s).

When 1*upa* of the equipment a sends to 1Ca a connection set request with the address of 1C designated, 1Ca constitutes a frame for such connection set and then send it to the infrared transmitter section 1*sa*.

1*sa* converts an electrical signal to an infrared radiation signal 1Ir2 and then send forth the same.

When the infrared receiver section 1*r* of repeater apparatus 1000 receives the infrared radiation 1Ir2, this section converts it to an electrical signal for passing to 1C.

At 1C, frame analysis is carried out resulting in recognition as the connection set frame, thereby sending a connection set indication to repeater section 100.

Upon reception of the connection set indication from 1C, 100 causes the storage section 1m, which is for storage of information obtainable from 1C, to store therein the content of such connection set indication.

In the case of the connection set indication, if a connection handle has been written then store it as information for identification of a connection between 1Ca and 1C.

100 refers to the storage sections 2m, 3m, 4m; if for example 2m stores therein an address for identifying the data link control section 2Cb of equipment b, then send to 2C a connection set request with the address of 2Cb designated; alternatively, if 3m stores an address for identifying the data link control section 3Cc of equipment c then send to 3C a connection set request with the address of 3Cc designated; still alternatively, if 4m stores an address for identifying the data link control section 4Cd of equipment d then send to 4C a connection set request with the address of 4Cd designated.

Upon receipt of connection set confirmations from 2C, 3C, 4C after having sent the connection set request to the data link control sections 2C, 3C, 4C, then 100 stores the content of a connection set confirmation from 2C into the storage section 2m for storage of information as obtained from 2C, stores the content of a connection set confirmation from 3C into the storage section 3m for storage of information as obtained from 3C, and stores the content of a connection set confirmation from 4C into the storage section 4m for storage of information as obtained from 4C, respectively.

Upon receiving the connection set confirmation from any one of 2C, 3C, 4C, then 100 sends to 1C a connection set response with a connection handle being written therein, which handle is for identification of a connection between 1Ca and 1C as stored in 1m.

Fourth Primitive Embodiment

As a fourth primitive example of the data link control sections 1C, 2C, 3C, 4C and of the repeater section 100, a flow will be described of signal processings between respective constituent elements, such as data send requests, data receive indications and the like, during data exchange services for performing data exchanging by use of one or more connections as set relative to associated equipment(s).

1$upa$ of equipment a assigns a connection handle for identification of a connection between 1C and 1Ca; when 1$upa$ sends to 1Ca a data send request which is added with data as transmitted by 1$upa$, 1Ca attempts to constitute a frame for use in transmitting data and then send it to the infrared transmitter section 1$sa$. 1$sa$ converts an electrical signal to an infrared radiation signal 1Ir2 for transmission.

When the infrared receiver section 1$r$ of repeater apparatus 1000 receives the infrared radiation 1Ir2, it converts it into an electrical signal which is then passed to 1C.

At 1C, frame analysis is effectuated, which in turn leads to recognition as a data receive frame, sending a data receive indication to repeater section 100.

Upon receipt of the data receive indication from 1C, then 100 recognizes the transmission data added by 1$upa$ and written into the data receive indication: 100 attempts to refer to the storage sections 2$m$, 3$m$, 4$m$ in a way such that if for example 2$m$ stores therein a connection handle for identification of a connection between 2Cb of equipment b and 2C, then assign the connection handle between 2Cb and 2C to thereby send to 2C a data send request that is added with transmission data as added by 1$upa$; if 3$m$ stores a connection handle for identification of a connection between 3Cc of equipment c and 3C, then assign the connection handle between 3Cc and 3C then sending to 3C a data send request that is added with transmission data as added by 1$upa$; if 4$m$ stores therein a connection handle for identification of a connection between 4Cd of equipment d and 4C then assign the connection handle between 4Cd and 4C sending to 4C a data send request being added with transmission data as added by 1$upa$.

FIFTH PRIMITIVE EXAMPLE

As a fifth primitive example of the data link control sections 1C, 2C, 3C, 4C and repeater section 100, a flow will be discussed herein of a processing between respective constituent elements of signals, such as connection cut request, connection cut indications and the like, for interrupting or cutting connections as set with associative equipment(s).

When 100 receives a connection cut indication from 1C, 100 deletes from the storage section 1$m$ a "memory" of certain connection handle which identifies the connection between 1C and 1Ca.

100 verifies whether those data link control sections 2C, 3C, 4C other than 1C have set connections; if another single data link control section alone has set such connection—by way of example, in the case where only 2C has set a connection with 2Cb of equipment b—100 sends to 2C a connection cut request that designates a connection handle between 2C and 2Cb, and then deletes from the storage section 2$m$ a memory of connection handle for identification of such connection between 2C and 2Cb.

100 operates to verify whether the data link control sections 2C, 3C, 4C except 1C have set connections; if two or more other data link control sections have set connections, then do nothing.

Fifth Embodiment

A fifth embodiment of the present invention will next be explained.

In the fifth embodiment an explanation will be given of the repeater apparatus of this invention which has in combination the basic configuration of the repeater apparatus of the invention as has been explained with regard to the first embodiment, the storage section for storage of information acquired from another equipment as has been explained in the second embodiment, and also the group setter section as has been explained in the third embodiment.

Also, while redundancy might arise, the basic procedure of the first embodiment will be described in detail; simultaneously in this embodiment, a definite explanation will also be given of the information acquisition procedure within the repeater apparatus as has been described in the embodiment 2, and further the method of allowing the group setter section stated in the embodiment 3 to perform the group settings.

The repeater apparatus 3000 of this invention will be explained based on the accompanying drawings.

Figure 12:
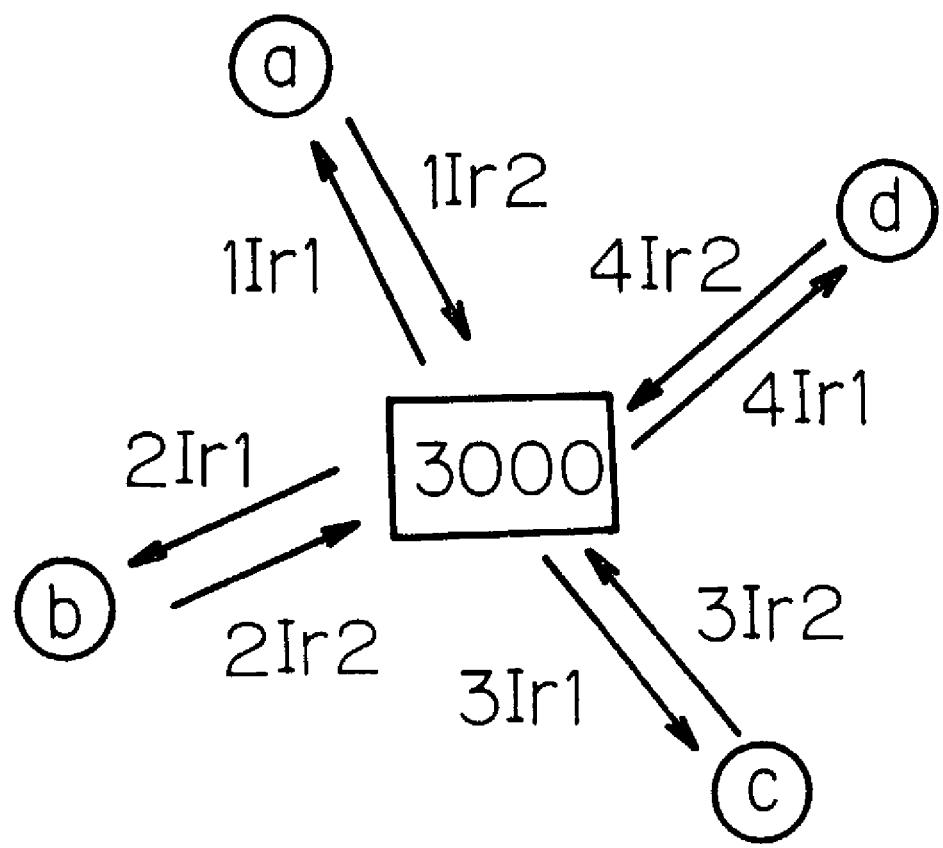
FIG. 12 is an exemplary layout of repeater apparatus in accordance with a fifth embodiment of the invention and its associative equipments.

FIG. 12 is a layout example of the repeater apparatus 3000 of the invention operatively associated with a plurality of equipments a, b, c, d, which apparatus is designed to perform connection-less type communications and connection type communications between respective applications at the equipments a, b, c, d.

Figure 13:
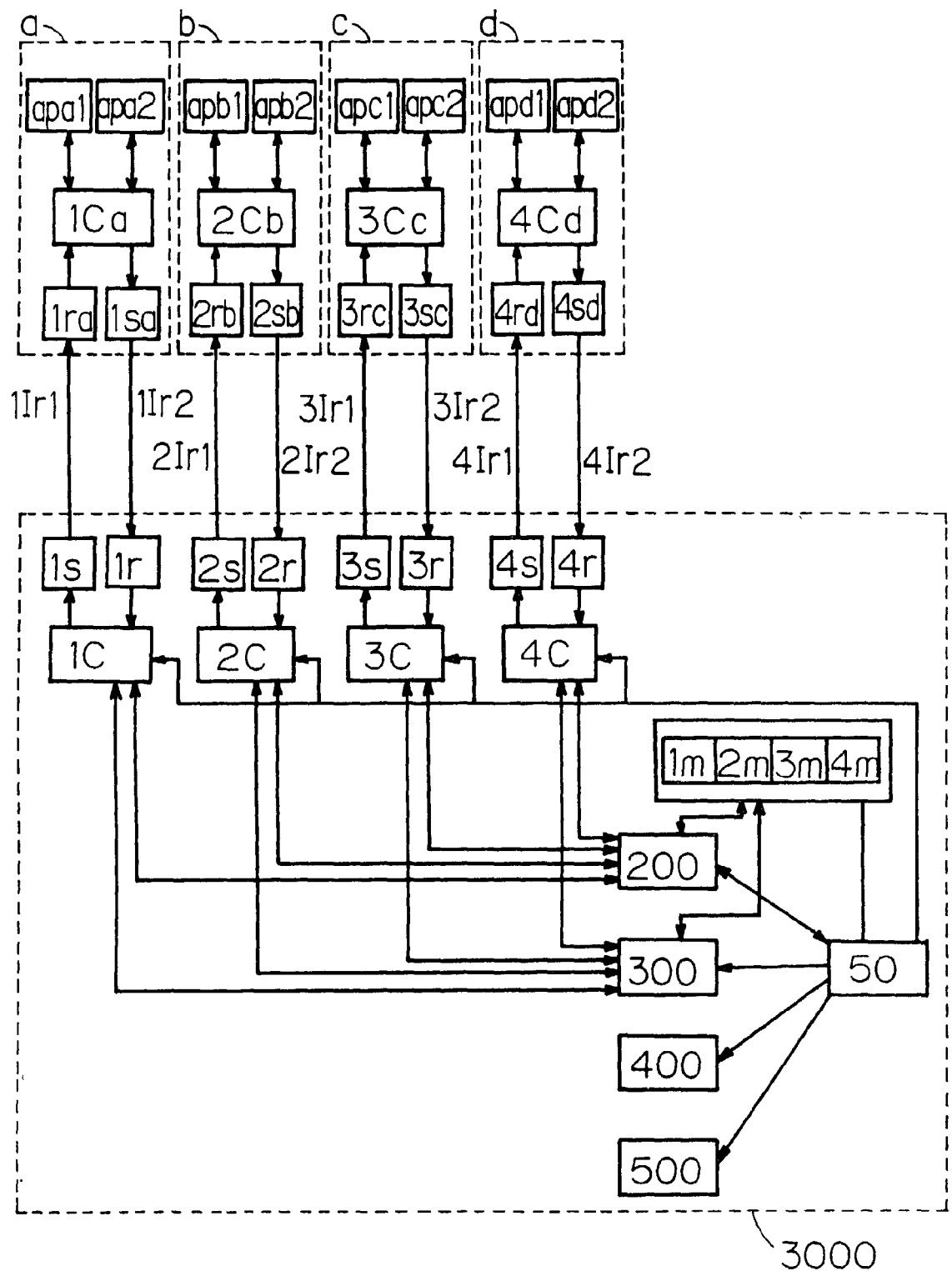
FIG. 13 is a block diagram showing a configuration of equipment communicable with the repeater apparatus of the fifth embodiment of the invention by use of the repeater apparatus.

FIG. 13 shows a block diagram of 3000.

1$s$ is an infrared transmitter section which is the device that converts an electrical signal into infrared radiation for forward transmission. 1$s$ and 1$r$ may alternatively be an infrared transmitter/receiver device which is defined by IrDA as a physical layer.

1$r$ is an infrared receiver section, which is the device for receiving infrared light and for converting it to an electrical signal.

10C is a data link control section which forms a connection with a data link control section 10Ca of another equipment a for example and is capable of performing a frame exchange thus providing a "virtual" environment which enables upper level layers to recognize as if an independent connection was set.

Optionally, 10C may be the one which complies with protocols defined by IrDA as IrLAP and protocols defining by IrDA as LM-MUX.

2$s$, 3$s$, 4$s$ are infrared transmitter sections having the same function as that of 1$s$; 2$r$, 4$r$ are infrared receiver sections similar in function to 1$r$; 20C, 30C, 40C are data link control sections similar in function to 10C.

200 is a repeater section that operates to input information as outputted from one data link control section to another data link control section.

300, 400, 500 are also repeater sections that are the same as 200 in that these operate to input information as outputted from one data link control section to other data link control sections.

50 is a group setter means, which may be a group setter section that regards as a single group certain ones of a plurality of connections as prepared by the data link control section, to which ones communicable applications correspond.

10$m$, 20$m$, 30$m$, 40$m$ are storage means, which may be memory sections for storing therein information obtainable from 10C, 20C, 30C, 40C and information as sent from the group setter section 50.

The repeater apparatus 3000 is constituted from the constituent elements described above.

The constituent elements of equipments a, b, c, d are as shown in FIG. 13, wherein equipments a, b, c, d are comprised of infrared transmitter devices 1sa, 2sb, 3sc, 4sd, infrared receiver devices 1ra, 2rb, 3rc, 4rd, data link control sections 10Ca, 20Cb, 30Cc, 40Cd, and upper level layers apa1, apa2, apb1, apb2, apc1, apc2, apd1, apd2.

Assume that apa1, apb1, apc1 and apd1 are communicable applications, respectively, whereas apa2, apb2, apc2, apd2 are communicable applications.

A repeating operation of the repeater apparatus 3000 will be explained below.

10C, 20C, 30C, 40C of the repeater apparatus 3000 pass various indications and confirmation to the repeater section 200; in turn, repeater section 200 passes various requests and responses to 10C, 20C, 30C, 40C.

For example, when various requests or responses are passed from the repeater section 200, 10C constitutes a corresponding frame and sends it to 1s; 10C also analyzes a frame based on a signal received from 1r for transmission to repeater section 200 as various indications or confirmations.

Further, it may also be possible in some cases that as a result of frame analysis based on the signal received from 1r, a frame is newly constituted for transmission to 1s.

As a first primitive example of the data link control sections 10C, 20C, 30C, 40C and repeater section 200, a flow will be explained of a processing, between respective constituent elements, of signals such as requests, indications, confirmations and the like during discovery services for finding an associative equipment.

When 1upa of equipment a sends a discovery request to 10Ca, 10Ca constitutes a frame for use in discovery and then sends it to infrared transmitter section 1sa.

1sa converts an electrical signal to an infrared radiation signal 1Ir2 for transmission.

When the infrared receiver section 1r of repeater apparatus 3000 receives the infrared radiation 1Ir2, this section converts it to an electrical signal which is then passed to 10C.

At 10C, frame analysis is done resulting in recognition as a discovery frame, then sending a discovery indication to repeater section 200.

Also, a discovery frame is constituted into which an address is written as information for identification of 10C; this frame is then sent to 1s.

Upon receipt of such discovery indication from 10C, the repeater section 200 stores the content of this discovery indication in the memory section 10m, which is inherently designed to store information as obtained from 10C.

In the case of discovery indication, if an address as prepared by 10Ca of a for identifying 10C is written, then store it in 10m.

Also, 200 sends a discovery request to data link control sections 20C, 30C, 40C other than 10C. Upon reception of discovery confirmations from data link control sections 20C, 30C, 40C after transmission of the discovery request thereto, 200 stores the content of discovery confirmation from 20C in the memory section 20m as designed to store information obtained from 20C, stores the content of discovery confirmation from 30C in the memory section 30m designed to store information obtained from 30C, and stores the content of discovery confirmation from 40C in the memory section 40m for storage of information obtained from 40C, respectively.

As a second primitive example of the data link control sections 10C, 20C, 30C, 40C and repeater section 200, a flow will be explained of a processing of signals between respective constituent elements, such as requests, indications, responses, confirmations and the like during connection set services for setting a connection with associated equipment.

When apa1 of equipment a sends to 10Ca a connection set request with an address for identifying 10C of 3000, 10Ca constitutes a connection frame and then sends it to infrared transmitter section 1sa. 1sa converts an electrical signal to an infrared radiation signal 1Ir2 for transmission.

When the infrared receiver section 1r of repeater apparatus 3000 receives the infrared radiation 1Ir2, this section converts it to an electrical signal which is then passed to 10C.

At 10C, frame analysis is done; if this results in that the content is recognized as the connection set request from apa1 of equipment a, then send a connection set indication to repeater section 200.

Upon receipt of such connection set indication from 10C, repeater section 200 stores the content of this connection set indication in the memory section 10m as designed to store information obtainable from 10C.

In the case of connection set indication, if an identifier is written which identifies a service access point assigned to apa1 of those service access points of 10Ca in the equipment a which has issued its connection set request, then store it.

200 refer to the memory sections 20m, 30m, 40m in a way such that if for example 20m stores therein the identifier of a service access point assigned to the application apb1 allowing the data link control section 20Cb of equipment b to be capable of communicating with apa1 of a, then send to 20C a connection set request with such service access point identifier designated; or alternatively, if 30m stores the identifier of a service access point assigned to the application apc1 permitting the data link control section 30Cc of equipment c to be communicable with apa1 of a, then send to 30C a connection set request with such service access point identifier designated; still alternatively, if 40m stores the identifier of a service access point assigned to the application apd1 rendering data link control section 40Cc of equipment c communicable with apa1 of a, then send to 40C a connection set request with such service access point identifier designated.

Upon receipt of connection set confirmations from data link control sections 20C, 30C, 40C after transmission of the connection set request thereto, the repeater section 200 attempts to store the content of connection set confirmation obtained from 20C in memory section 20m as designed to store information obtained from 20C, store the content of connection set confirmation from 30C in the memory section 30m designed to store information obtained from 30C, and store the content of connection set confirmation from 40C in the memory section 40m designed to store storage of information obtained from 40C, respectively.

Alternatively, where 20C and 20Cb have established a connection between the repeater section 200 and apb1 of equipment b as a result of receiving the connection set confirmation, the presence of such connection is stored in memory section 20m; when 30C and 30Cc established a connection between repeater section 200 and apc1 of equipment c as a result of receiving the set confirmation, presence of such connection is stored in memory section 30m; if 40C and 40Cd established a connection between repeater section 200 and apd1 of equipment d as a result of receiving the set confirmation, presence of such connection is stored in memory section 40m.

Upon receipt of a connection set confirmation from any one of 20C, 30C, 40C, the repeater section 200 sends to 10C a connection set response with an identifier designated, which is for identifying certain service access point assigned to apa1 of those link access points of 10Ca in the equipment a which has issued the connection set request.

As a third primitive example of the data link control sections 10C, 20C, 30C, 40C and repeater section 200, a flow will be explained of a processing signals between respective constituent elements, such as data send requests, data receive indications and the like during data exchange services for performing data exchanging by utilizing a connection as set with associative equipment.

When apa1 of equipment a sends to 10Ca a data send request added with data thereto, 10Ca constitutes a frame for use in data transmission and then sends it to infrared transmitter section 1sa.

1sa converts an electrical signal to an infrared radiation signal 1Ir2 for transmission.

When the infrared receiver section 1r of the repeater apparatus 3000 receives the infrared radiation 1Ir2, this section converts it to an electrical signal, which is then passed to 10C.

At 10C, frame analysis is carried out; if its content is recognized as data transmission from apa1 of equipment a, then send a data receive indication to repeater section 200.

Upon receipt of such data receive indication from 10C, the repeater section 200 recognizes the transmission data added by apa1 as written in the data receive indication; then, 200 refers to memory sections 20m, 30m, 40m in such a way that if for example 20m stores therein the presence of a connection between repeater section 200 and apb1 of equipment b, then send to 20C a data send request added with transmission data which has been added by apa1; or alternatively, if 30m stores presence of a connection between repeater section 200 and apc1 of equipment c then send to 30C a data send request added with transmission data which has been added by apa1; still alternatively, if 40m stores presence of a connection between repeater section 200 and apd1 of equipment d then send to 40C a data send request added with transmission data as has been added by apa1.

As a fourth primitive example of data link control sections 10C, 20C, 30C, 40C and repeater section 200, a flow will be explained of a processing of signals between respective constituent elements, such as connection cut or "cut" requests, connection cut indications and others for disconnecting once-established connections with associative equipment.

Upon receipt of a connection cut indication from 10C, the repeater section 200 operates to delete from memory section 10m the memory of presence of a connection between repeater section 200 and apa1 of equipment a.

200 accesses 20m, 30m, 40m for confirmation to determine whether the data link control sections 20C, 30C, 40C establish connections between apb1 and repeater section 200, between apc1 and repeater section 200, and between apd1 and repeater section 200, respectively; if only one additional data link control section has set its connection—for example, when 20C alone has established a connection between apb1 and repeater section 200 between itself and 20Cb of equipment b—200 sends to 2C a connection cut request for cutting a link connection between apb1 and repeater section 200 as has been established by 20C between it and 20Cb of equipment b, and then deletes from memory section 20m the memory of presence of such connection between repeater section 200 and apb1 of equipment b.

On the other hand, 200 attempts to access 20m, 30m, 40m determining whether the data link control sections 20C, 30C, 40C have established connections between apb1 and repeater section 200, between apc1 and repeater section 200, and between apd1 and repeater section 200, respectively; if two or more additional data link control sections have set connections, then do nothing.

An explanation will now be given of a flow of signal processing between respective constituent elements as required in the case of acquiring information from another equipment and providing such acquired information to yet another equipment and also the case of performing group settings.

Now, suppose that apa1, apb1, apc1 and apd1 are certain applications that are present in the upper level of mutually data-exchangeable data link control sections, that apa1, apb1, apc1, apd1 store information concerning applications respective equipments have in the equipments a, b, c, d in which themselves exist, and that their stored information may be provided in response to receipt of a request from an associative party.

apa1 stores therein the identifier of service access point at 10Ca as assigned to the application apa2 that exists in equipment a.

Similarly, apb1, apc1 and apd1 store therein identifiers of service access points of data link control sections as assigned to respective applications.

Upon receipt of a data receive indication from 10C, the repeater section 200 analyzes the transmission data as written in the data receive indication added by apa1; in a case where recognition was made such that certain information is under question which concerns the application capable of performing a data exchange with apa2, access the memory section 10m to perform confirmation of information as to such application capable of data exchange with apa2.

Where memory section 10m stores therein the information concerning the application capable of data-exchanging with apa2, acquire or fetch from 10m specific information as to such application capable of data-exchanging with apa2, then passing a data send request into which it is written.

Where memory section 10m does not store the information concerning the application capable of data-exchanging with apa2, 200 attempts to refer to memory sections 20m, 30m, 40m; by way of example, if 20m stores the presence of a connection between repeater section 200 and apb1 of equipment b, then send to 20C a data send request which is added, as transmission data, with data for questioning the information as to the application apb2 data-exchangeable with apa2 in equipment b; alternatively, if 30m stores presence of a connection between repeater section 200 and apc1 of equipment c then send to 30C a data send request added as transmission data with data for questioning information as to the application apc2 data-exchangeable with apa2 in equipment c; still alternatively, if 40m stores presence of a connection between repeater section 200 and apd1 of equipment d then send to 40C a data send request added as transmission data with data for questioning information as to the application apd2 data-exchangeable with apa2 in equipment d.

The repeater section 200 receives a data receive indication from any one of the data link control sections. 200 attempts to analyze the content of data as written into the data receive indication. And, where 200 recognizes that certain information as to the application capable of data-exchanging with apa2 is described therein, the section 200 then verifies whether information concerning such application data-exchangeable with apa2 has already been stored in 10m, 20m,

30m, 40m; if not, then store the information therein. Subsequently, 200 passes, in order to send the information to apa1 of equipment a, a data send request that writes therein certain information stored in 10m concerning the application capable of data-exchanging with apb2 toward the data link control section 10C which has initially uploaded its data receive indication having its content of questioning the information as to the application data-exchangeable with apa2.

On the other hand, upon receiving the data receive indication from 10C, the repeater section 200 executes analysis of send data as added by apa1 and written in the data receive indication; where it is recognized that the information is under question which concerns the application data-exchangeable with apa2, if in the infrared repeater apparatus 3000 the identifier is under question which is of a service access point at 10C assigned to the application data-exchangeable with apa2, then access memory section 10m to verify the information as to the identifier of service access point at 10C assigned to the application data-exchangeable with apa2.

Where the memory section 10m stores therein the information concerning the identifier of the service access point at 10C as assigned to the application capable of data-exchanging with apa2, acquire from 10m the information as to the identifier of the service access point at 10C assigned to the application data-exchangeable with apa2, then passing a data send request writing it thereinto.

Where the memory section 10m does not store therein the information concerning the identifier of the service access point at 10C as assigned to the application capable of data-exchanging with apa2, 200 attempts to refer to memory sections 20m, 30m, 40m; for instance, if 20m stores the presence of a connection between repeater section 200 and apb1 of equipment b, then send to 20C a data send request which is added, as transmission data, with data for questioning information as to the identifier of the service access point at 20Cb as assigned to the application apb2 data-exchangeable with apa2 in equipment b; alternatively, if 30m stores presence of a connection between repeater section 200 and apc1 of equipment c then send to 30C a data send request added as transmission data with data for questioning information as to the identifier of the service access point at 30Cc as assigned to the application apc2 data-exchangeable with apa2 in equipment c; still alternatively, if 40m stores presence of a connection between repeater section 200 and apd1 of equipment d then send to 40C a data send request added as transmission data with data for questioning information as to the identifier of the service access point at 40Cd as assigned to the application apd2 data-exchangeable with apa2 in equipment d.

Upon receiving a data receive indication from any one of the data link control sections, the repeater section 200 analyzes the content of data as written into the data receive indication; in the case of recognizing as a result of writing at associative equipment the information as to the identifier of service access point at the date link control section assigned to the application capable of data-exchanging with apa2, then verify which 10m, 20m, 30m and 40m stores the information as to the identifier of service access point at the data link control section as assigned to such application data-exchangeable with apa2.

If none of them store it, then request the group setter section 50 to resister the identifier of service access point at the data link control section as assigned to the application capable of data-exchanging with apb2 in the infrared communications repeater equipment 3000.

Upon receiving from the repeater section 200 the request to register the identifier of service access point at the data link control section as assigned to the application capable of data-exchanging with apb2 in the infrared communications repeater equipment 3000, the group setter section 50 regards as a single group the connections as established by the application capable of data-exchanging with apb2 with respect to the repeater apparatus 3000, and then prepare the repeater section 300 which becomes capable of performing data exchanging within this group only, while selecting an identifier of an out-of-use service access point in each data link control section.

And, the group setter section 50 passes to the repeater section 300 indications and confirmation signals from those service access points of resultant identifiers as selected for respective data link control sections 10C, 20C, 30C, 40C, thereby providing control to ensure that the signals of requests and responses from repeater section 300 are passed from the service access points of assigned identifiers to respective data link control sections 10C, 20C, 30C, 40C.

Also, 50 registers to the memory section 10m the identifier of the service access point at 10C as assigned to the repeater section 300 as an identifier of service access point at 10C assigned to the application capable of data-exchanging with apa2; register to memory section 20m the identifier of the service access point at 20C as assigned to repeater section 300 as an identifier of service access point at 20C assigned to the application capable of data-exchanging with apa2; register to the memory section 30m the identifier of the service access point at 30C as assigned to the repeater section 300 as an identifier of service access point at 30C assigned to the application capable of data-exchanging with apa2; and, register to the memory section 40m the identifier of the service access point at 40C as assigned to repeater section 300 as an identifier of service access point at 40C assigned to the application capable of data-exchanging with apa2.

Furthermore, in order to cause the repeater section 200 to send information to apa1 of equipment a, 50 requests the data link control section 10C—this has initially uploaded its data receive indication having the content of questioning the information concerning the identifier of service access point at 10C as assigned to the application capable of data-exchanging with apa2—to pass a data send request that writes thereinto the information as to the identifier stored in 10m, which identifier is of service access point at 10C as assigned to the application capable of data-exchanging with apa2.

Upon receipt of the aforesaid request from the group setter section 50, the repeater 200 executes this request content.

The group setter section 50 is such that in cases where respective equipments a, b, c, d have mutually communicable applications apa3, apb3, apc3, apd3 and apa4, apb4, apc4, apd4 in a similar way that the repeater section 300 is formed which corresponds to the mutually communicable applications apa2, apb2, apc2, apd2 as possessed by respective equipments a, b, c, d, it is also capable of forming a repeater section 400 and repeater section 500 corresponding thereto respectively.

The repeater sections 300, 400, 500 as formed by the group setter section 50 perform at least the connection set services and data exchange services of those functions of the repeater section 200 as explained in the above embodiment.

Sixth Embodiment

A sixth embodiment will be explained.

Next, by using three repeater devices each of which may be similar to that as explained in the fifth embodiment, multiconnection is established with respect to four direct-emission type infrared communication apparatuses thereby providing an N-to-N type communication form among four equipments.

Figure 14:
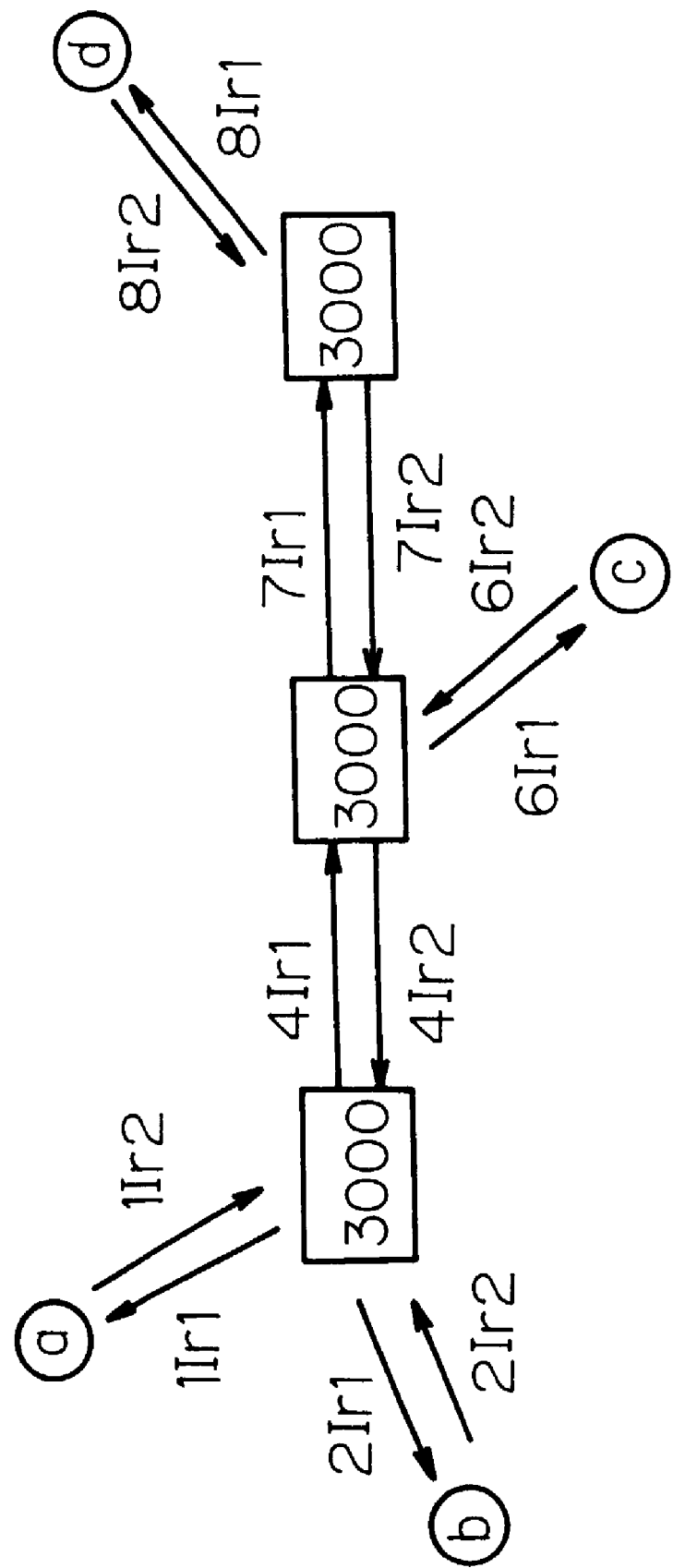
FIG. 14 is an exemplary layout of repeater apparatus in accordance with a sixth embodiment of the invention and its associated equipments.
Figure 15:
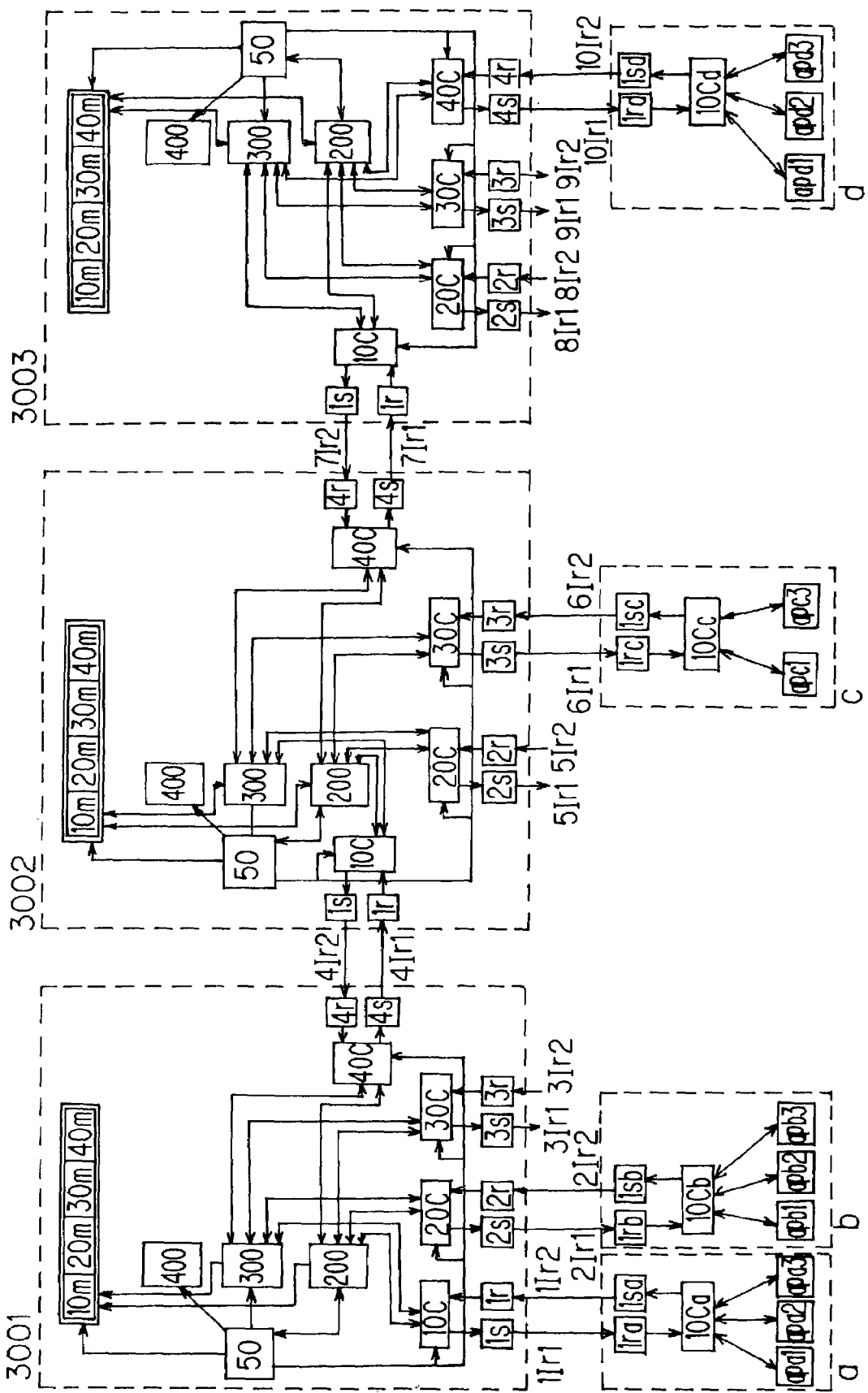
FIG. 15 is a block diagram showing a configuration of equipment communicable with the repeater apparatus of the sixth embodiment of the invention by use of such repeater apparatus.

FIG. 14 shows a layout relationship of a plurality of equipments a, b, c, d and repeater apparatuses 3001, 3002, 3003 as explained in the fifth embodiment, whist FIG. 15 shows a block diagram of each equipment.

It should be noted here that constituent elements having the same reference characters as those explained in the fifth embodiment are to be supposed to contain those functions stated in the fifth embodiment with any detailed functional explanations thereof being eliminated herein. The constituent elements of equipments a, b, c, d are as shown in FIG. 15, wherein the equipment a has apa1, apa2, apa3 an upper level layers; the equipment b has apb1, apb2, apb3 as upper level layers; the equipment c has apc1, apc2, apc3 as upper level layers; and, the equipment d has apd1, apd2, apd3 as upper level layers: apa1, apb1, apc1, apd1 store therein information concerning applications respective equipments have in equipments a, b, c, d in which they self-exist, wherein these are applications for providing stored information in response to receipt of a request from an associative party.

Upon issuance of a discovery request at the equipment a, the repeater section 200 of repeater apparatus 3001 may receive a discovery indication from the data link control section 10C.

Upon receiving such discovery indication, the repeater section 200 of 3001 sends a discovery request to 20C, 30C, 40C in 3001. As a result, discovery or "find" confirmations are obtained from 20C and 40C so that it becomes aware of presence of the equipment b and equipment 3002.

On the other hand, when the repeater apparatus 3001 generates and issues a connection set request with an application communicable with apa1, the repeater section 200 of repeater apparatus 3002 receives this connection set request from the data link control section 10C as a connection set indication for setting a connection with the application communicable with apa1.

When receiving such discovery indication, the repeater section 200 of 3002 sends a discovery request to 20C, 30C and 40C in 3002. This results in discovery confirmation being obtained from 30C and 40C, which in turn leads to acknowledgement of the presence of equipment c and equipment 3003.

Further, repeater section 200 of repeater apparatus 3003 receives from the data link control section 10C the discovery request as issued at the repeater apparatus 3002, as a discovery indication.

When receiving the discovery indication, repeater section 200 of 3003 sends a discovery request to 20C, 30C, 40C in 3003, resulting in discovery confirmation being obtained from 40C, which in turn leads to acknowledgement of presence of equipment d.

Upon issuance of a connection set request of apa1 in the equipment a, repeater section 200 of repeater apparatus 3001 should receive it from data link control section 10C as a connection set indication for setting a connection with the application communicable with apa1.

Upon receipt of this connection set indication, repeater section 200 of 3001 sends to 20C and 40C in 3001 a connection set request for setting a connection with the application communicable with apa1.

As a result, if a connection set confirmation is obtained from either one of 20C and 40C, repeater section 200 of 3001 then sends a connection set response to 10C.

On the other hand, when the repeater apparatus 3001 generates and issues a connection set request with an application communicable with apa1, the repeater section 200 of repeater apparatus 3002 receives this connection set request from the data link control section 10C as a connection set indication for setting a connection with the application communicable with apa1.

Upon receiving this connection set indication, repeater section 200 of 3002 sends to 30C and 40C in 3002 a connection set request for setting a connection with the application communicable with apa1.

As a result, if a connection set confirmation is obtained from either one of 30C and 40C, repeater section 200 of 3002 then sends a connection set response to 10C.

Further, when the repeater apparatus 3002 issues a connection set request with the application communicable with apa1, the repeater sections 200 of repeater apparatus 3003 receives this connection set request from data link control section 10C as a connection set indication for setting a connection with the application communicable with apa1.

Upon receiving this connection set indication, repeater section 200 of 3003 sends to 40C in 3003 a connection set request for setting a connection with the application communicable with apa1.

As a result, if a connection set confirmation is obtained from 40C, repeater section 200 of 3003 sends a connection set response to 10C.

As a result of execution of the above operations, multi-connections are established between apa1 of equipment a and 200 of equipment 3001, between apb1 of equipment b and 200 of equipment 3001, between 200 of equipment 3001 and 200 of equipment 3002, between apc1 of equipment c and 200 of equipment 3002, between 200 of equipment 3002 and 200 of equipment 3003, and between apd1 of equipment d and 200 of equipment 3003, thereby enabling a data exchange among apa1, apb1, apc1 and apd1.

For example, when the equipment a issues a data send request for sending data from apa1, the repeater section 200 of repeater apparatus 3001 receives a data receive indication from data link control section 10C for recognition of data from apa1.

The repeater section 200 of 3001 issues a data send request as added with data which has been sent from apa1 toward 20C and 40C which set connections between apa1 and the data-exchangeable application.

On the other hand, when the repeater apparatus 3001 outputs the data send request added with data sent from apa1, the repeater section 200 of repeater apparatus 3002 receives this data send request from the data link control section 10C as a data receive indication, to thereby recognize the data from apa1.

Repeater section 200 of 3002 issues a data send request added with the date sent from apa1 toward 30C and 40C which set connections between apa1 and data-exchangeable application.

Further, when the repeater apparatus 3002 outputs the data send request added with the data sent from apa1, the repeater section 200 of repeater apparatus 3003 receives this data send request from the data link control section 10C as a data receive indication thus recognizing data from apa1.

Repeater section 200 of 3003 then issues a data send request being added with the data sent from apa1 to 40C that sets a connection between apa1 and data-exchangeable application.

As a result of the above operations, the data sent from apa1 of equipment a is transferred to apb1 of equipment b and apc1 of equipment c as well as apd1 of equipment c.

Similarly, each equipment issues its own data send request whereby the data sent from apb1 of equipment b and the data sent from apc1 of equipment c as well as the data sent from apd1 of equipment d may also be transferred to other equipments operatively associated therewith.

Now suppose that the equipment b wants to perform a connection set of apb2; if this is the case, when a data send request is made in a route from apb1 to repeater apparatus 3001, which request has its content of questioning the identifier of a service access point at 20C of 3001 as assigned to the application capable of exchanging data with apb2, the repeater section 200 of repeater apparatus 3001 receives a data receive indication from data link control section 20C to recognize that the identifier is under question in repeater apparatus 3001, which identifier is of a service access point at 20C of 3001 as assigned to the application capable of exchanging date with apb2.

The repeater section 200 of 3001 refers to 20m; if there is not stored in repeater apparatus 3001 the identifier of service access point at 20C of 3001 as assigned to the application capable of exchanging data with apb2, then issue to 10C a data send request having its content of questioning the identifier of service access point at 10Ca of equipment a as assigned to the application capable of exchanging data with apb2, while simultaneously issuing to 40C a data send request with its content of questioning the identifier of service access point at 10C of 3002 as assigned to the application capable of exchanging data with apb2.

As a result, the data receive indication is received from either one of 10C and 40C: when obtaining the identifier of service access point assigned to the application capable of exchanging data with apb2 at equipment b or repeater apparatus 3002, the repeater section 200 of 3001 requests the group setter section 50 to form the repeater section 300, issuing to 20C a data send request which contains an identifier of service access point assigned between 300 and 20C, as the identifier of service access point assigned to the application capable of exchanging data with apb2 in 20C of repeater apparatus 3001.

On the other hand, when a data send request is issued from repeater apparatus 3001 which request has its content of questioning the identifier of service access point at 10C of 3002 as assigned to the application capable of exchanging data with apb2, the repeater section 200 of repeater apparatus 3002 receives a data receive indication from data link control section 10C to thereby recognize that the identifier is under question in repeater apparatus 3002, which identifier is of the service access point at 10C of 3002 as assigned to the application capable of exchanging data with apb2.

The repeater section 200 of 3002 refers to 10m; if there is not stored in repeater apparatus 3002 the identifier of service access point at 10C of 3002 as assigned to the application capable of exchanging data with apb2, then issue to 30C a data send request having its content of questioning the identifier of service access point at 10Cc of equipment c as assigned to the application capable of exchanging data with apb2 while issuing to 40C a data send request with its content of questioning the identifier of service access point at 10C of 3003 as assigned to the application capable of exchanging data with apb2.

As a result, a data receive indication is received from 40C: when obtaining the identifier of service access point assigned to the application capable of exchanging data with apb2 at the repeater apparatus 3003, the repeater section 200 of 3002 requests group setter section 50 to form repeater section 300, issuing to 10C a data send request which contains therein the identifier of service access point assigned between 3002 and 10C, as the identifier of service access point assigned to the application capable of exchanging data with apb2 at 10C of repeater apparatus 3002.

Further, when a data send request is issued from repeater apparatus 3002 which request has its content of questioning the identifier of service access point at 10C of 3003 as assigned to the application capable of exchanging data with apb2, the repeater section 200 of repeater apparatus 3003 receives a data receive indication from data link control section 10C to thereby recognize that the identifier is under question in repeater apparatus 3003, which is of service access point aft 10C of 3003 as assigned to the application capable of exchanging data with apb2.

The repeater section 200 of 3003 refers to 10m; if there is not stored in repeater apparatus 3003 the identifier of service access point at 10C of 3003 as assigned to the application capable of exchanging data with apb2, than issue to 40C a data send request having its content of questioning the identifier of service access point at 10Cd of equipment d as assigned to the application capable of exchanging data with apb2.

As a result, the data receive indication is received from 40C: when obtaining the identifier of service access point assigned to the application capable of exchanging data with apb2 at equipment d, the repeater section 200 of 3003 requests group setter section 50 to prepare the repeater section 300, issuing to 10C a data send request which contains therein an identifier of service access point assigned between 3002 and 10C, as the identifier of service access point assigned to the application capable of exchanging data with apb2 in 10C of repeater apparatus 3002.

As a result of the above processings, the repeater apparatuses 3001, 3002, 3003 are provided with repeater sections 300 respectively; by way of example, when apb2 of equipment b issues a connection set request, the connection set indication is uploaded to 300 of 3001, which results in the connection set request being transferred thus permitting establishment of multiconnections between apa2 of equipment a and 300 of equipment 3001, between apb2 of equipment b and 300 of equipment 3001, between 300 of equipment 3001 and 300 of equipment 3002, between 300 of equipment 3002 and 300 of equipment 3003, and between apd2 of equipment d and 300 of equipment 3003, which in turn leads to capability of exchanging data among apa2, apb2, apc2 and apd2.

Also, the repeater apparatuses 3001, 3002, 3003 form repeater sections 400, respectively, thereby setting multiconnections between apa3 of equipment a and 400 of equipment 3001, between apb3 of equipment b and 400 of equipment 3001, between 400 of equipment 3001 and 400 of equipment 3002, between apc3 of equipment c and 400 of equipment 3002, between 400 of equipment 3002 and 400 of equipment 3003, and between apd3 of equipment d and 400 of equipment 3003, which in turn leads to capability of exchanging data among apa3, apb3, apc3 and apd3.

Seventh Embodiment

Below is an explanation of a seventh embodiment of the present invention in conjunction with FIGS. 16, 17 and 18.

A repeater apparatus 4000 will be explained with reference to the accompanying drawing. Note here that the repeater apparatus 4000 may be configured using the repeater apparatus 1001 as described in the first embodiment, the repeater apparatus 1002 described in the second embodiment, the repeater apparatus 1003 stated in the third embodiment, or any equivalents thereto.

Figure 16:
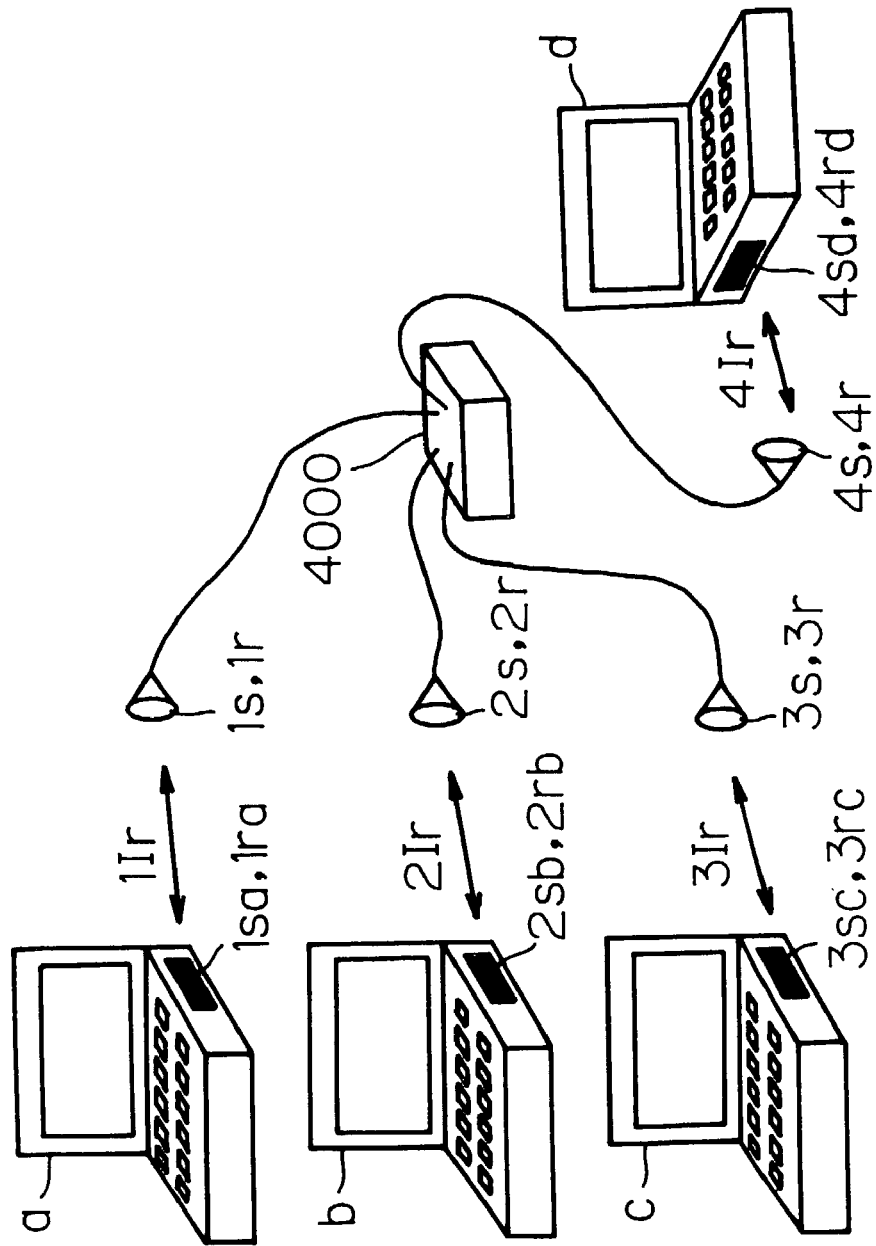
FIG. 16 is an exemplary layout of repeater apparatus 4000 among a plurality of equipments a, b, c and d.
Figure 17:
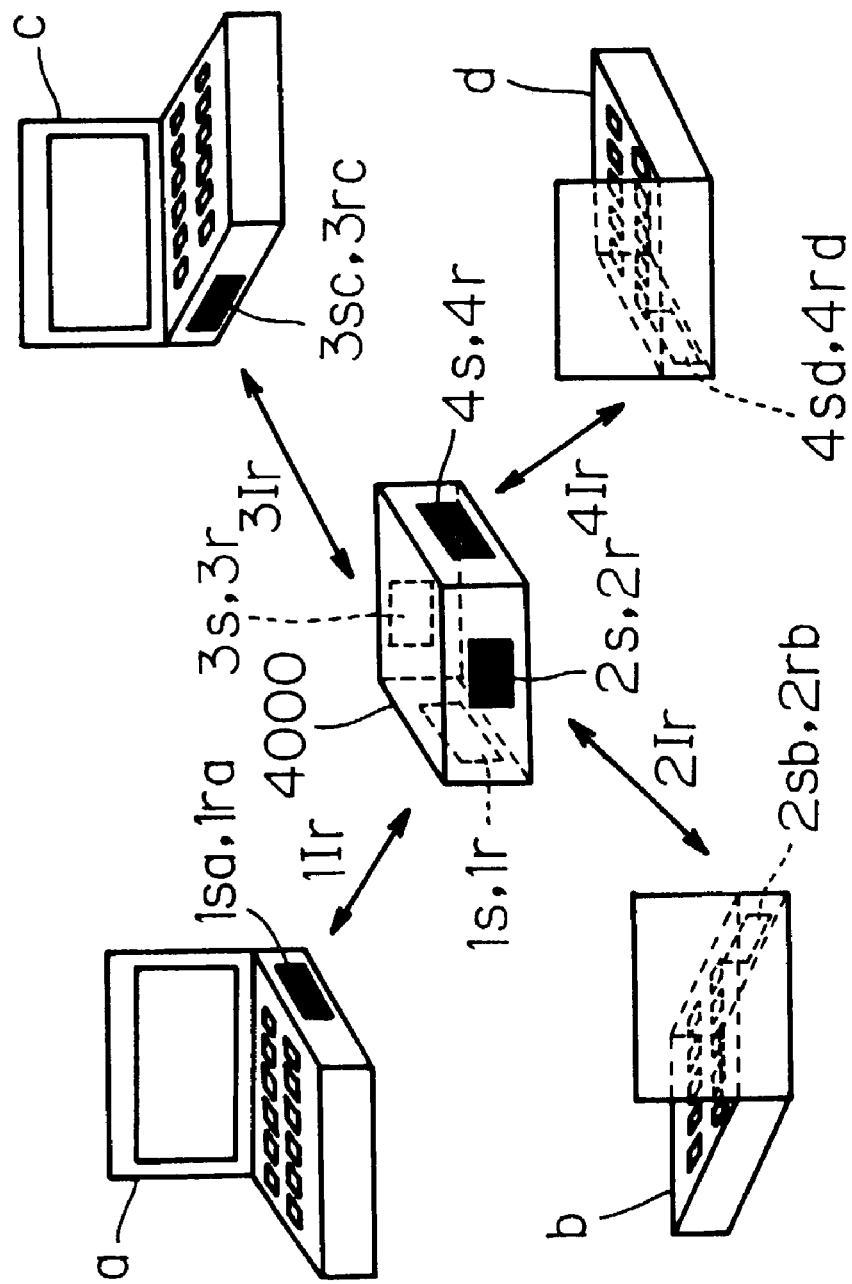
FIG. 17 is another exemplary layout of the repeater apparatus 4000 in a similar fashion.

FIGS. 16 and 17 are layout examples of the repeater apparatus 400 capable of performing either connection-less type communications or connection type communications among a plurality of equipments a, b, c, d.

Figure 18:
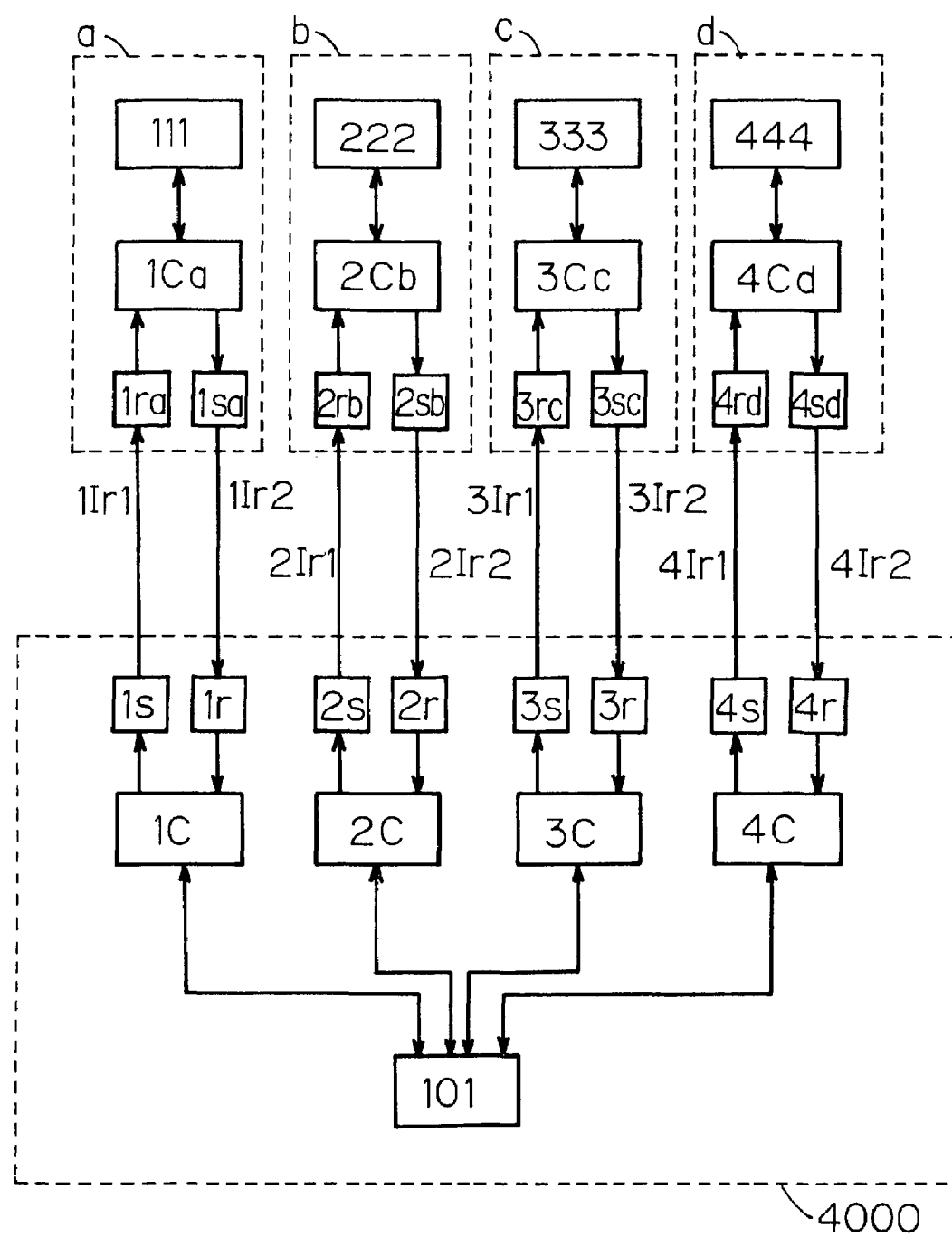
FIG. 18 is a block diagram of the repeater apparatus 4000.

FIG. 18 shows a block diagram of repeater apparatus 4000.

1$s$ is an infrared transmitter section, which is the device for converting an electrical signal to infrared radiation and then sending forth it. 1$r$ is an infrared receiver section which is the device for receiving infrared light for conversion to an electrical signal. 1C is a connection control section that may be capable of setting 1-to-1 type connections for infrared communications between it and another equipment operatively associated therewith. 2$s$, 3$s$ and 4$s$ are infrared transmitter sections similar in function to 1$s$; 2$r$, 3$r$, 4$r$ are infrared receiver sections similar in function to 1$s$; 2C, 3C, 4C are connection control sections similar in function to 1C. 101 is a repeater section that functions to input information outputted from one connection control section to another connection control section.

Next, the constituent elements of equipments a, b, c, d are as shown in FIG. 18, wherein equipments a, b, c, d are comprised of infrared transmitter devices 1$sa$, 2$sb$, 3$sc$, 4$sd$, infrared receiver devices 1$ra$, 2$rb$, 3$rc$, 4$rd$, connection control sections 1Ca, 2Cb, 3Cc, 4Cd, and main control sections 111, 222, 333, 444 acting as upper-level layers.

The main communication section 111 has a communication protocol or application for identifying communicable equipments and for selecting given equipment from among such communicable equipments to constitute a group, thereby setting logical communication links between equipments belonging to the group.

A function of the main communication section 111 will be described as follows.

The main communication section 111 has its function of generating identification information of the equipment of itself to send it to another equipment; it also attempts, upon receiving equipment identity information, to determine that it is possible to communicate with equipment which has sent forth this equipment identity information for storage of it as a communicable associated equipment. Further, the section selects one or several associative equipments desiring communications, sets a group, and establishes a logical communication link between equipments belonging to the group. Upon setting of such logical communication link at a given equipment, a group set signal is transmitted permitting a group to be set at the associative equipment also.

For example, where equipments a, b, c belong to a single group, b and c are set as a group at equipment a, whereas a and c are set as a group at equipment b, while a and b are set as a group at equipment c.

Data transfer between those equipments belonging to the group thus established is such that it is possible, by adding to headers or the like of transmission data packets either equipment identity information or group identity information of multiple associative parties, to transmit signals simultaneously to a plurality of associative parties belonging to the group in a single transmission event.

The main communication section 111 could be a communication protocol or an application having a function of identifying any communicable equipment in the way described above and constituting a group together with part or all thereof for establishment of communication links, thus enabling operations in N-to-N type communication form environments.

Below is an explanation of a method of exchanging and routing, by use of the repeater apparatus 4000, data information or the like among the main communication sections 111, 222, 333, 444 of a plurality of equipments.

Various signals are exchanged either between 1C, 2C, 3C, 4C and repeater section 101 of repeater apparatus 4000 or between the connection control section of each equipment a, b, c, d and the main communication section 111, 222, 333, 444 thereof. Here, a signal to be passed from the connection control section to its upper level layer is defined as an indication and a confirmation, whist a signal being passed from the upper level layer to the connection control section is defined as a request and a response. It should be noted that in the repeater apparatus 4000 the repeater section 101 is the upper level layer of connection control section, and that the main communication sections 111, 222, 333, 444 in respective equipments are defined as the upper level layer in equipments a, b, c, d.

When various request and response signals are passed from the upper level layer, the connection control section constitutes an appropriate frame corresponding thereto to send it to 1$s$, while analyzing a frame based on a signal received from 1$r$ for passing it to its upper level layer as an indication or confirmation signal that complies with the content. Here, the term "frame" as used herein is defined as the format of data or control signals to be exchanged between the connection control sections.

For example, where a connection set request is input to the connection control section 1Ca of equipment a for setting a connection between it and 1C of repeater apparatus 4000, the repeater section 101 of repeater apparatus 4000 receives a connection set indication from the connection control section 1C; after a connection is set with at least one or more equipments by the method as described using the flow chart of FIG. 3 in the first embodiment, a connection set response is returned to 1C whereby the connection is established for infrared communications between equipment a and repeater apparatus 4000. Alternatively, upon receipt of a connection set indication from connection control section 1C, the repeater section 101 returns its connection set response to 1C thereby establishing a connection for infrared communications between equipment a and repeater apparatus 4000. Still alternatively, at the stage of receiving a frame with its content of causing connection control section 1C to set a connection, the connection control section 1C per se acts to return a frame with its content of accepting the connection set, whereby when repeater section 101 receives the connection set indication from connection control section 1C, a corresponding connection for infrared communications may be set between equipment a and repeater apparatus 4000 without having to return any connection set response.

With regard to data exchange, if it is after completion of setting connections (setting multiconnection) between a plurality of equipments and repeater apparatus 4000 respectively, the repeater section 101 of repeater apparatus 4000 receives as a data receive indication the data send request which has been input by the upper level layer of each equipment to the connection control section, and then transfers it to the connection control section of another equipment by use of the method as discussed using the flow chart of FIG. 4 in the first embodiment, whereby the upper level layer of another equipment should receive the data receive indication from the connection control section. Where the upper level layer on the transmitter side sends date, transmission data of upper level layer is added to the data send request. The connection control section on the transmitter side constitutes a frame in reply to the data send request added with the upper-level layer's data and then transfers it to the connection control section on the receiver side. At the connection control section on the receiver side, upon receiving such frame, a data receive indication is passed to the upper level layer. Alternatively, if a receive request is available from the receiver side upper-level layer, a data receive confirmation is constituted from a corresponding frame and is passed. Consider that this data receive indication is added with transmission data of the upper level layer on the transmitter side.

111 generates its self-equipment identity information; when transmitting it to another equipment, at the stage that the equipment a does not set a connection for infrared communications, said self-equipment identity information signal is input as the connection set request to the connection control section 1Ca of equipment a. If 1Ca of equipment a has already set the connection between it and 1C of repeater apparatus 4000, said self-equipment identity information is added to the data send request for inputting to 1Ca.

After multiconnection was set between equipments a, b, c, d and repeater apparatus 4000, the equipment identity information generated at 111 of equipment a is transferred to the repeater section 101 while it is added to the data send request being input to 1Ca; when this is done, 101 directly adds the data information (in this case, the equipment identity information as generated at 111 of equipment a) of 111—this information has been added to the data receive indication received from 1C—to its data send request for input to other connection control sections 2C, 3C, 4C. As a result, frames are sent from the connection control section 2C to the connection control section 2Cb of equipment b, from connection control section 3C to connection control section 3Cc of equipment c, and from connection control section 4C to connection control section 4Cd of equipment d; the connection control sections 2Cb, 3Cc, 4Cd of other equipments b, c, d operate to directly pass data receive indications added with the equipment identity information of 111 to respective upper level layers thereof, thus enabling 222, 333 and 444 to recognize the equipment identity information of 111. Similarly, the equipment identity information generated at 222 is transferred to 111, 333 and 444; the equipment identity information generated at 333 is sent to 111, 222, 444; and, the equipment identity information generated at 444 is to 111, 222, 333. Also, where for example equipment a attempts to set a logical communication link while setting the equipments a, b, c as a group, a group set signal from 111 of equipment a is added to the data send request being input to 1Ca for transferring toward repeater section 101; as a result, the connection control sections 2Cb, 3Cc of other equipments b, c pass to their respective upper-level layers the data receive indications that has been added with the group set signal from 111, thus allowing 222 and 333 to recognize the group set signal from 111 to thereby make it possible to perform group settings at equipments b, c. Further, also regarding data transfer between equipments belonging to a group established, a send data packet—this has its header or the like added with either equipment identity information of plural target parties belonging to the group or the group identity number—is added to the data send request on the transmitter side; on the receiver side, it recognizes the one added to data receive indication, thereby enabling simultaneous data transmission to a plurality of target parties belonging to the group in a single transmission event.

As has been described above, it becomes possible by use of the repeater apparatus 4000 of this invention to attain N-to-N communication forms even where connection control sections, which are positioned at a lower level of the main control sections 111, 222, 333, 444 to set connections for infrared communications, are incapable of providing N-to-N type communication forms, while enabling accomplishment of simultaneous data transmission between equipments belonging to a group by setting the group—i.e. logical communication link—by allowing main control sections 111, 222, 333, 444 to exchange the equipment identity information or group set signals among plural equipments which have set infrared communication connections with the repeater apparatus.

In the above embodiment the infrared transmitter section and infrared receiver section may alternatively be physical layers as defined by IrDA standards while the connection control section may include a protocol layer of IrLAP defined by IrDA standards or protocol layers of both IrLAP and IrLMP defined by IrDA.

What is claimed is:

1. A repeater apparatus provided among a plurality of infrared communication equipment, comprising:

a plurality of control means each for carrying out information transmission and reception between one of the infrared communication equipment, and each including an infrared transmitter, and an infrared receiver; and transferring means for transferring information between the plurality of control means;

wherein at least one service access point is provided between the transferring means and each of the control means; and wherein the transferring means is further for acquiring from one of the infrared communication equipment specified information along with information about a service access point for the infrared communication equipment, and for, when the specified information is relayed to a different one of the infrared communication equipment through one of the control means, converting the information about the service access point to information about a specified service access point between the control means and the transferring means, and transmitting the converted information to the different one of the infrared communication equipment through the control means.

2. A repeater apparatus provided among a plurality of infrared communication equipment, comprising:

a plurality of control means each for carrying out information transmission and reception with one of the infrared communication equipment, and each including an infrared transmitter, and an infrared receiver; and transferring means for transferring the information between the plurality of control means;

wherein at least one service access point for transferring the information is provided between each of the control means and the transferring means; and wherein the transferring means is further for setting a group on the basis of the service access points belonging to each of the control means, and relaying the information among the service access points belonging to the set group.

3. A repeater apparatus provided among a plurality of communication equipment, comprising:

a plurality of control means each for carrying out information transmission and reception between one of the communication equipment, and each including a transmitter, and a receiver; and transferring means for transferring the information between the plurality of control means;

wherein at least one service access point for transferring the information is provided between each of the control means and the transferring means; and wherein the transferring means is further for acquiring from one of the plurality of communication equipment specified information together with information about a service access point of the one of the plurality of communication equipment through one of the plurality of control means, and for, when the specified information is relayed to a different one of the plurality of communication equipment through a different one of the plurality of control means, converting the information about the service access point of the one of the plurality of communication equipment to information about a specified service access point between the different one of the plurality of control means and the transferring means, and transmitting the converted information to the different one of the plurality of communication equipment through the different one of the plurality of control means.

4. A repeater apparatus provided among a plurality of communication equipment, comprising:

a plurality of control means each for carrying out information transmission and reception between one of the communication equipment, and each including a transmitter and a receiver; and transferring means for transferring the information between the plurality of control means;

wherein at least one service access point for transferring the information is provided between each of the control means and the transferring means; and wherein the transferring means is further for setting a group on the basis of the service access points belonging to each of the control means, and relaying the information among the service access points belonging to the set group.

5. A repeating method in a repeater apparatus provided among a plurality of infrared communication equipment, the repeater apparatus comprising a plurality of control means each for carrying out information transmission and reception between one of the infrared communication equipment, and each including an infrared transmitter and an infrared receiver, and transferring means for transferring the information among the control means, and wherein at least one service access point for transferring the information is provided between each of the plurality of control means and the transferring means, the method comprising:

acquiring, by the transferring means, specified information together with information about a service access point of one of the plurality of infrared communication equipment through one of the plurality of control means from one of the infrared communication equipment;

converting, by the transferring means when the specified information is relayed to a different one of the plurality of infrared communication equipment through a different one of the plurality of control means, the information about the service access point of the one of the plurality of infrared communication equipment to information about a specified service access point between the different one of the plurality of control means and the transferring means; and transmitting, by the transferring means, the converted information to the different one of the plurality of infrared communication equipment through the different one of the plurality of control means.

6. A repeating method in a repeater apparatus provided among a plurality of infrared communication equipment, the repeater apparatus comprising a plurality of control means for carrying out information transmission and reception with one of the infrared communication equipment, and each including an infrared transmitter and an infrared receiver, and transferring means for transferring the information among the control means, and wherein at least one service access point for transferring the information is provided between each of the control means and the transferring means, the method comprising:

setting, by the transferring means, a group on the basis of the service access points belonging to each of the control means; and relaying, by the transferring means, the information among the service access points belonging to the set group.

7. A repeating method in a repeater apparatus provided among the plurality of communication equipment, the repeater apparatus comprising a plurality of control means each for carrying out information transmission and reception with one of the communication equipment, and each including a transmitter and a receiver, and transferring means for transferring the information among the control means, wherein at least one service access point for transferring the information is provided between each of the control means and the transferring means, the method comprising:

acquiring, by the transferring means, specified information together with information about a service access point of the one of the plurality of communication equipment from one of the plurality of communication equipment;

converting, by the transferring means when the specified information is relayed to a different one of the plurality of communication equipment through a different one of the plurality of control means, the information about the service access point of the one of the plurality of communication equipment to information about a specified service access point between the different one of the plurality of control means and transferring means; and transmitting, by the transferring means, the converted information to the different one of the plurality of communication equipment through the different one of the plurality of control means.

8. A repeating method in a repeater apparatus provided among a plurality of communication equipment, the repeater apparatus comprising a plurality of control means each for carrying out information transmission and reception with one of the communication equipment, and each including a transmitter and a receiver, and transferring means for transferring the information among the control means, wherein at least one service access point for transferring the information is provided between each of the control means and the transferring means, the method comprising:

setting, by the transferring means, a group on the basis of the service access points belonging to each of the control means; and relaying, by the transferring means, the information among the service access points belonging to the set group.

9. A repeater apparatus for connecting a plurality of infrared communication equipment, comprising:
- a plurality of control means each for carrying out information transmission and reception between one of the plurality of infrared communication equipment, and each including an infrared transmitter and an infrared receiver;
- transferring means for transferring information between the plurality of control means; and
- a control means for carrying out information transmission and reception with a second repeater apparatus;
- wherein the transferring means includes storing means for storing information received from the plurality of control means;
- wherein the transferring means is further for, when one of the plurality of infrared communication equipment requests specified information through one of the plurality of control means, transmitting the specified information to the one of the plurality of infrared communication equipment through the one of the plurality of control means, if the specified information is stored in the storing means; and wherein the transferring means further includes means for transferring information between the plurality of control means and the control means for carrying out information transmission and reception with the second repeater apparatus.

* * * * *